Aug. 25, 1942.       J. B. ARMITAGE ET AL       2,293,880
MACHINE TOOL TRANSMISSION AND CONTROL MECHANISM
Filed July 22, 1938       12 Sheets-Sheet 1
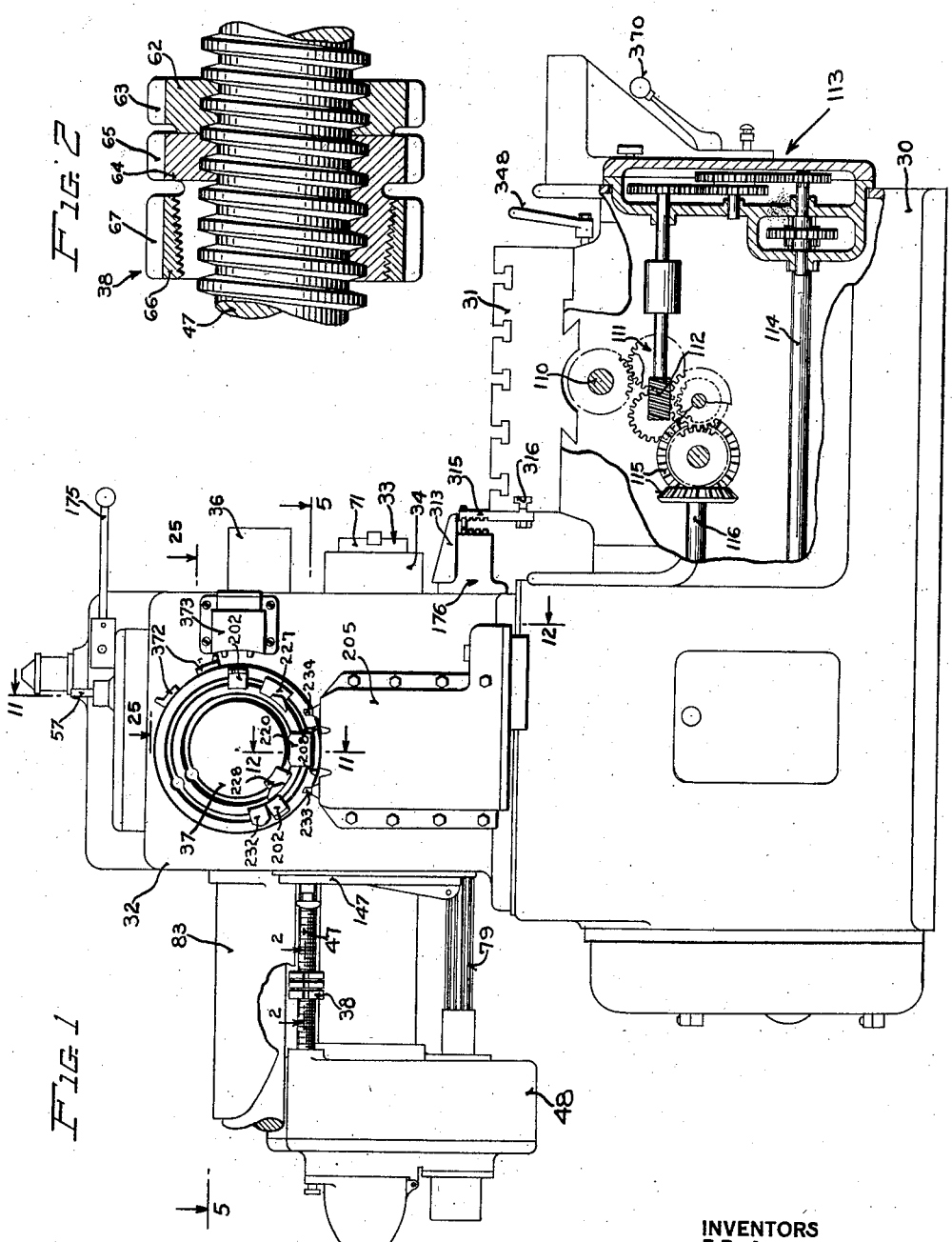
INVENTORS
J. B. ARMITAGE
BY   O. W. BARKER
W. D. O'Connor
ATTORNEY Aug. 25, 1942.   J. B. ARMITAGE ET AL   2,293,880
MACHINE TOOL TRANSMISSION AND CONTROL MECHANISM
Filed July 22, 1938   12 Sheets-Sheet 2
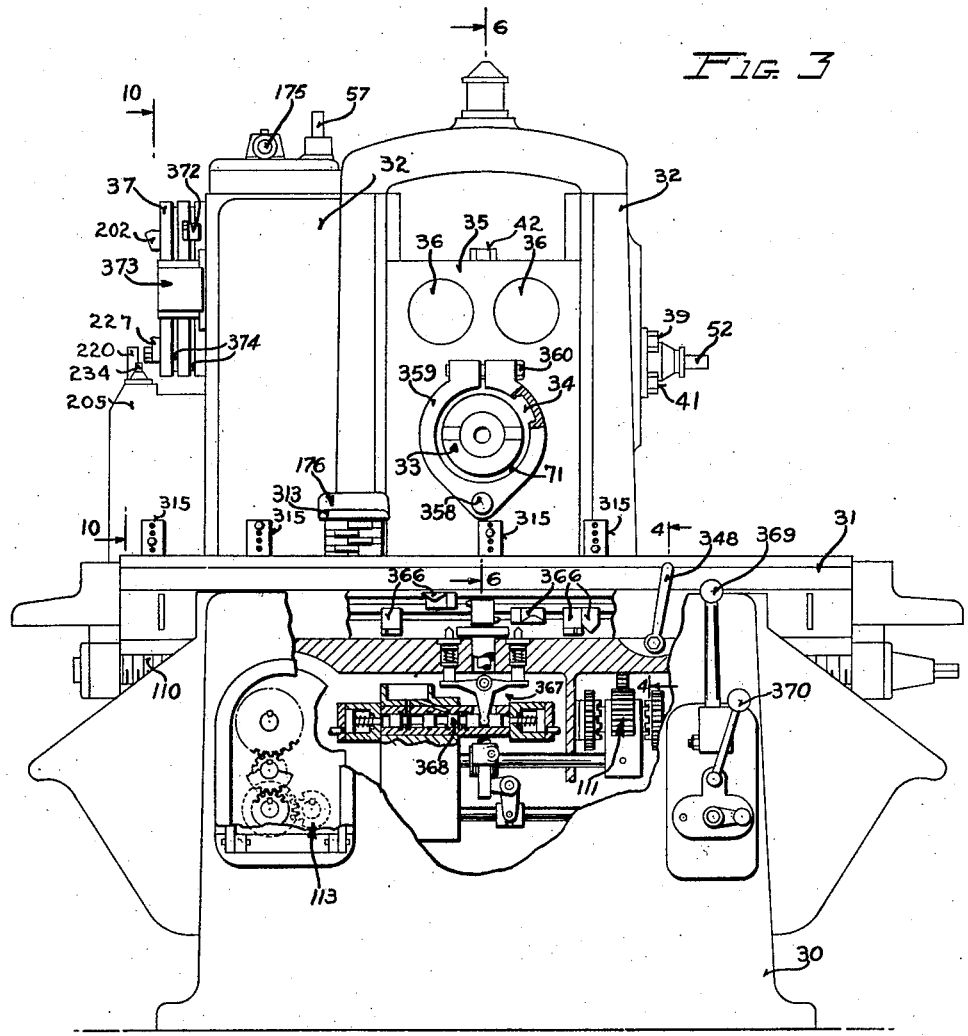
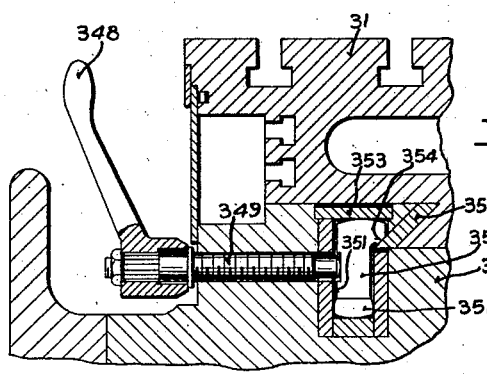
INVENTORS
J. B. ARMITAGE
O. W. BARKER
BY  W. D. O'Connor
ATTORNEY

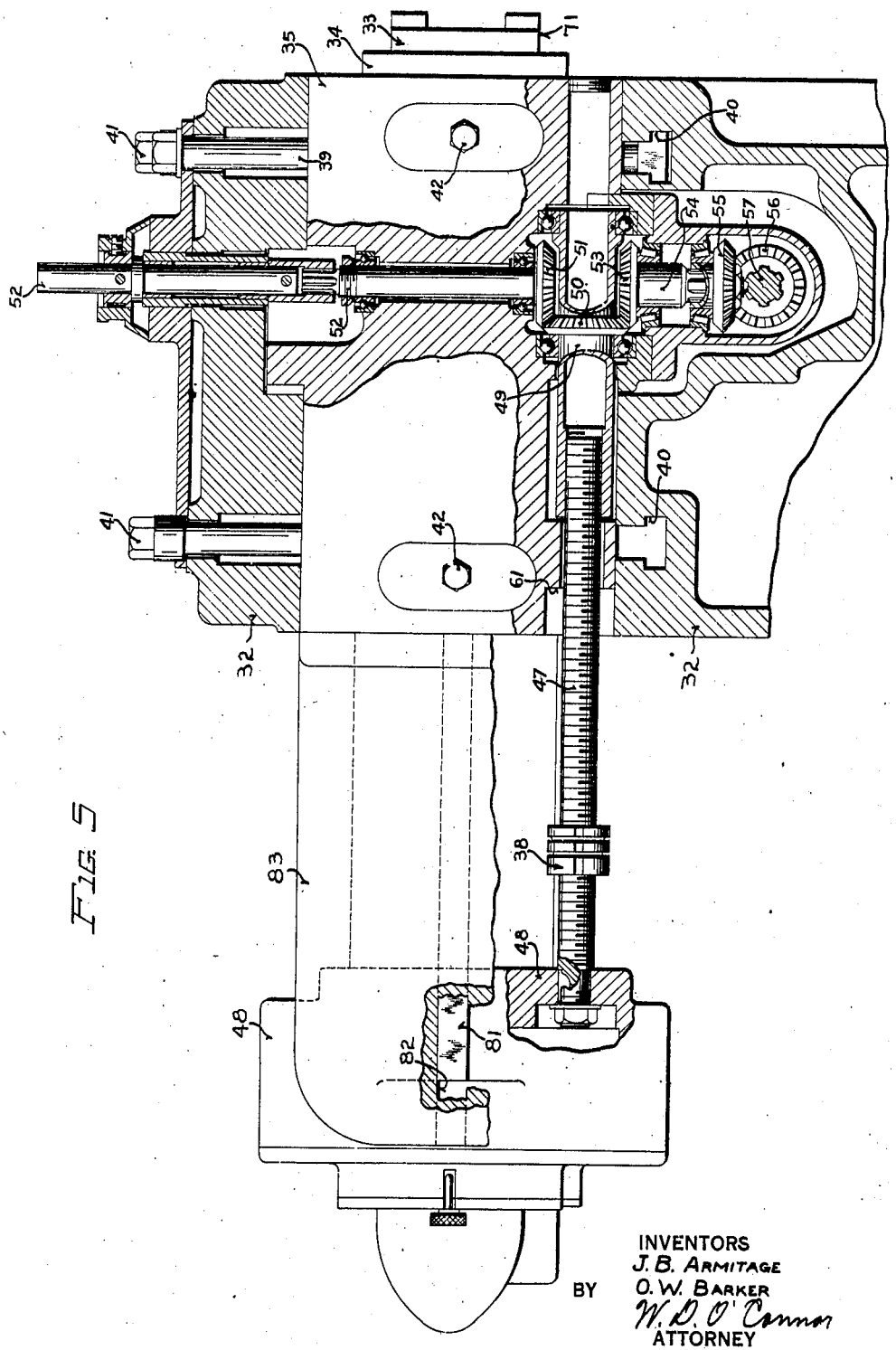

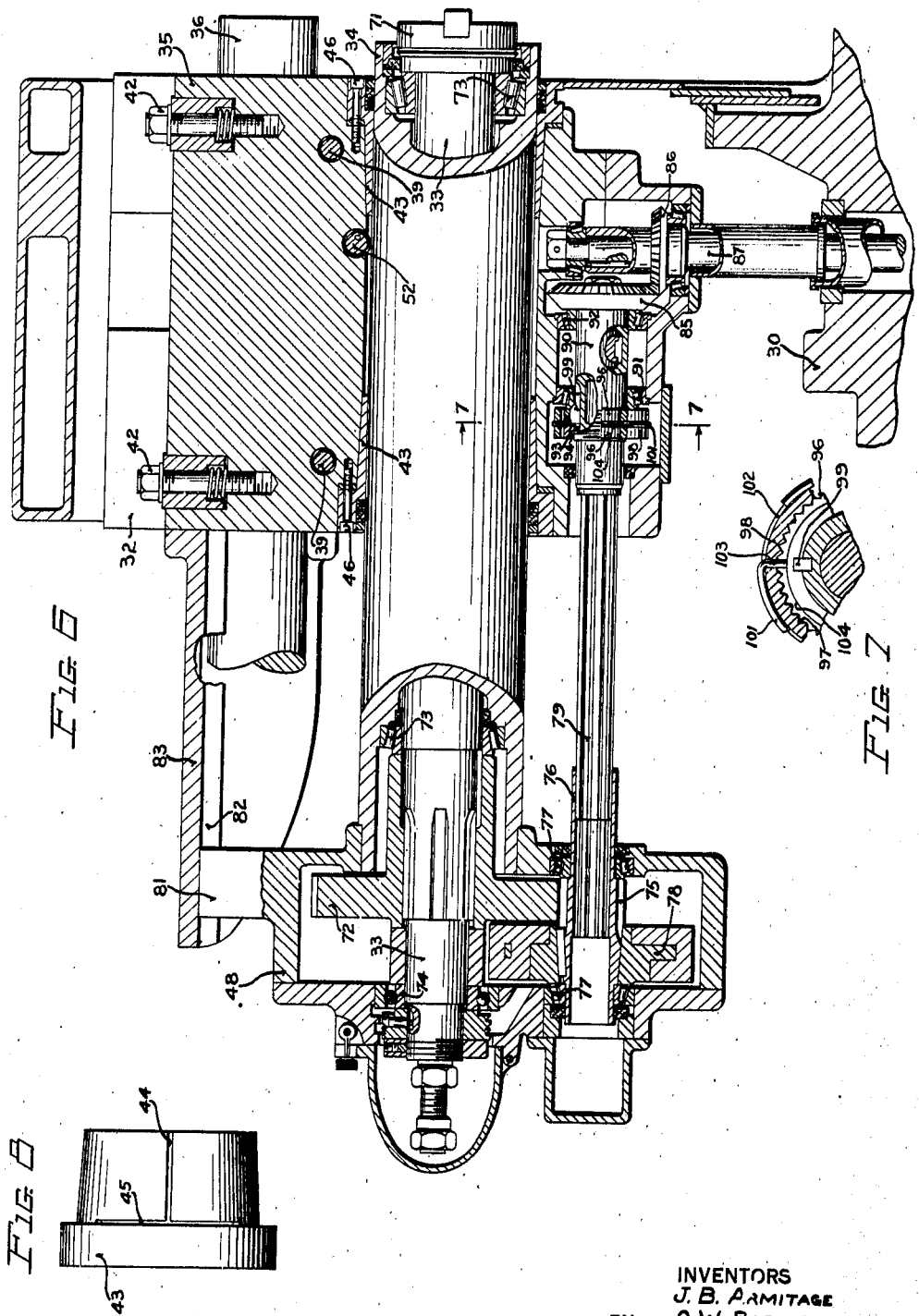

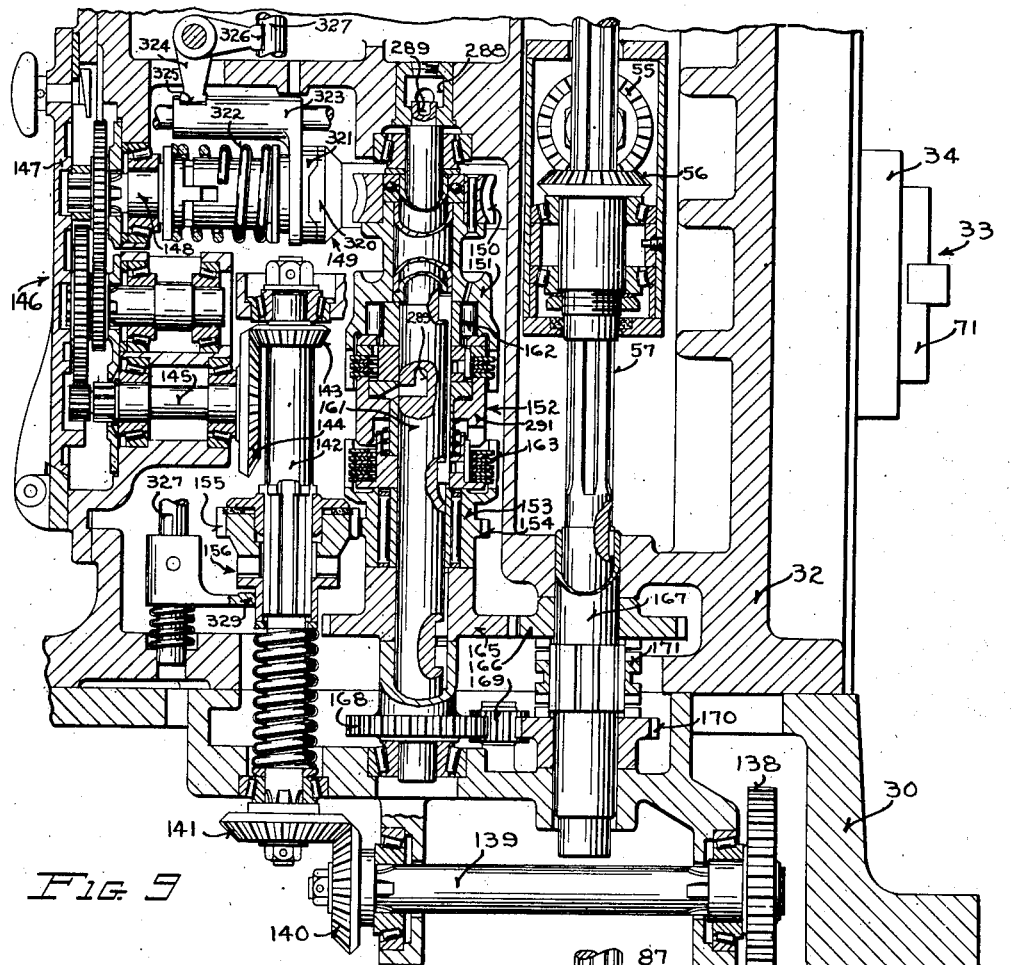
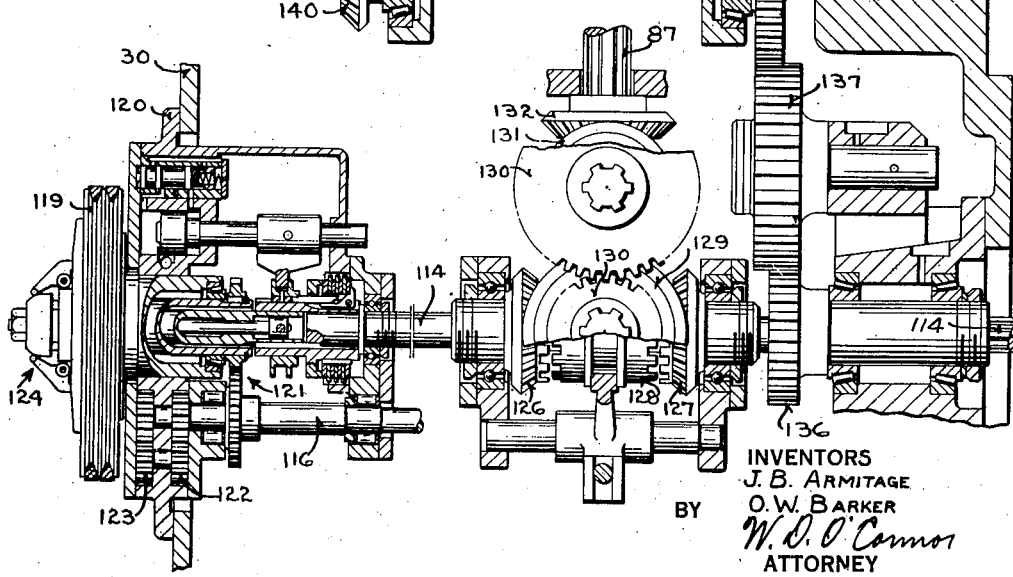

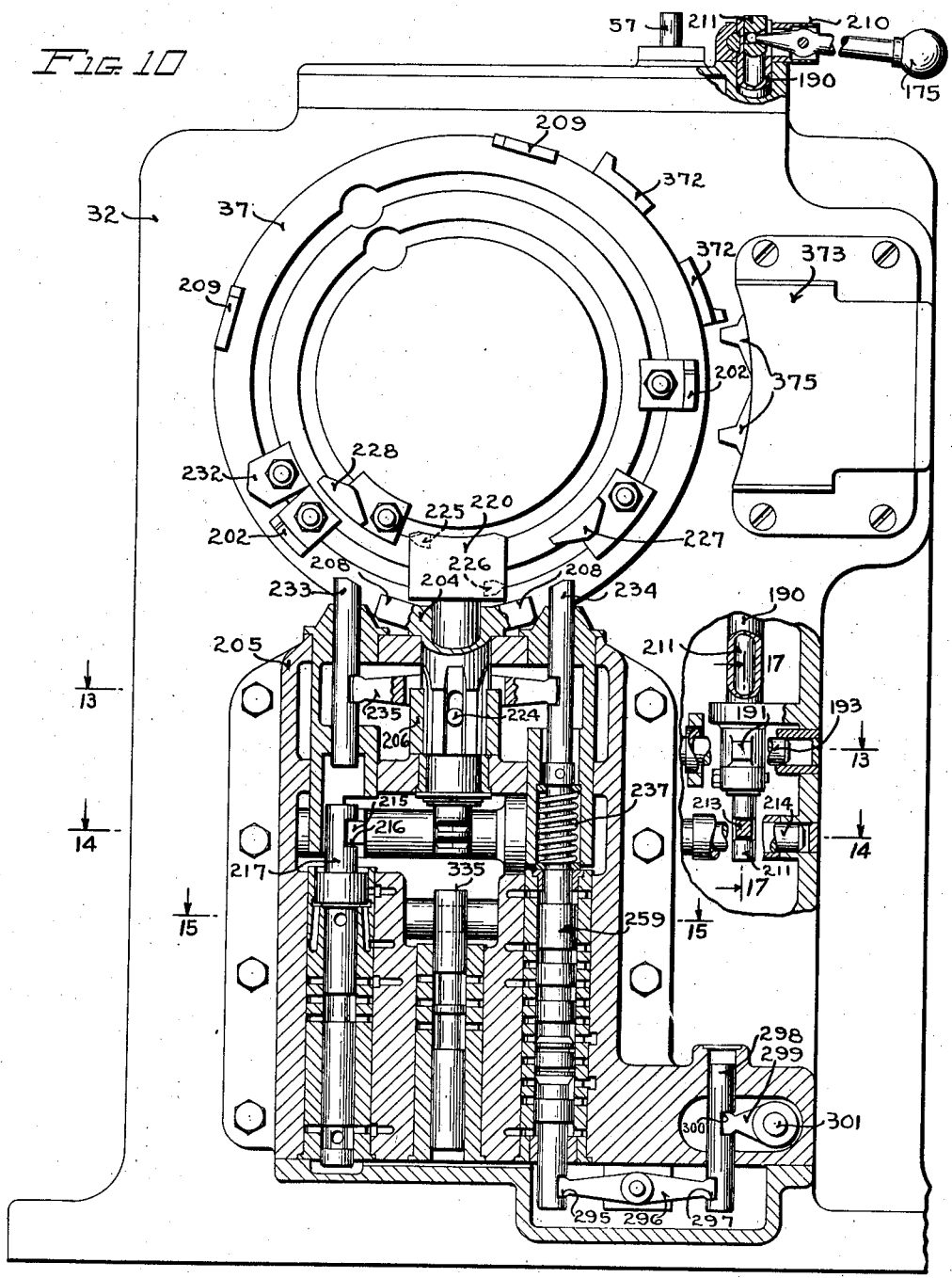

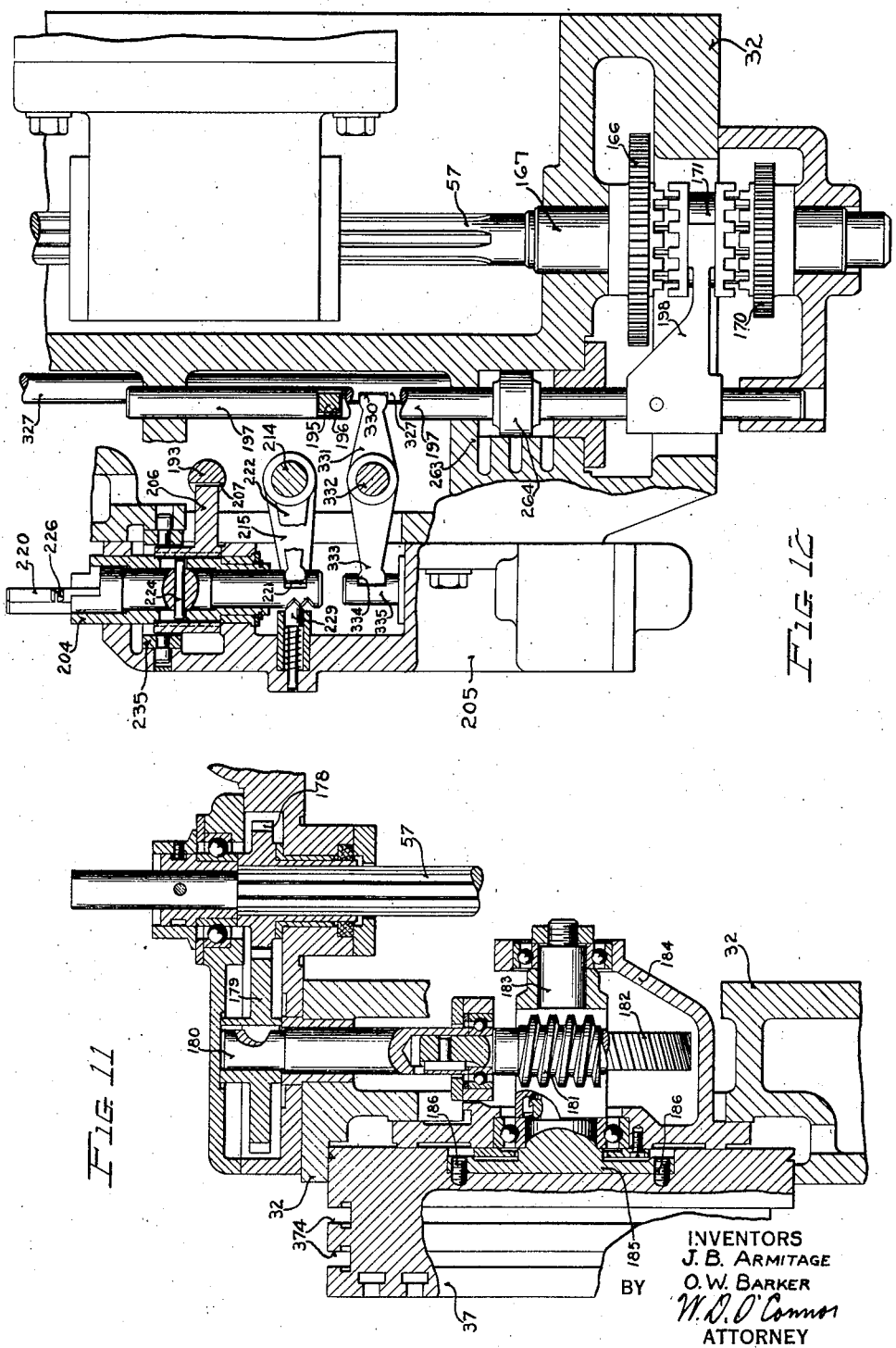

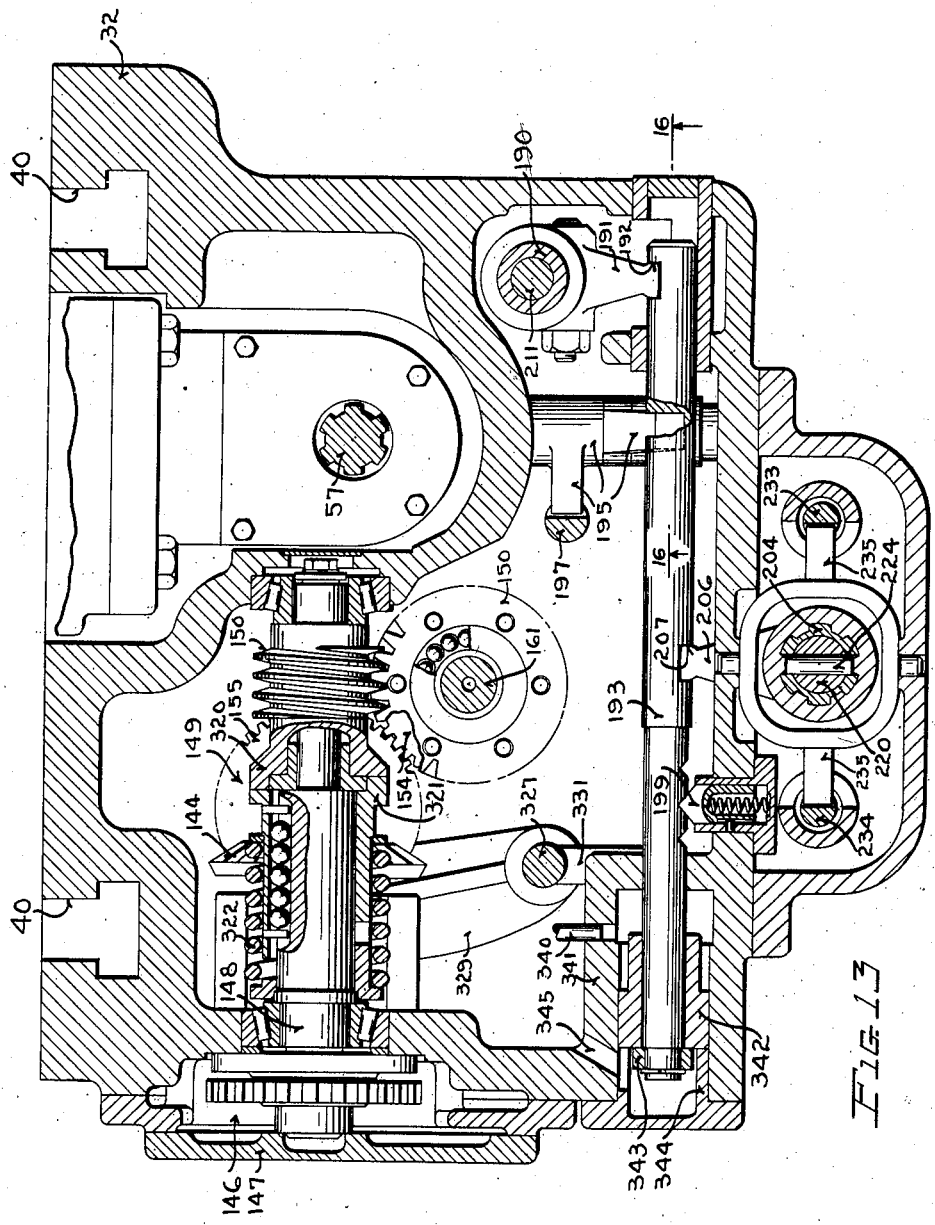

Aug. 25, 1942.   J. B. ARMITAGE ET AL   2,293,880
MACHINE TOOL TRANSMISSION AND CONTROL MECHANISM
Filed July 22, 1938   12 Sheets-Sheet 9

INVENTORS
J. B. ARMITAGE
O. W. BARKER
BY W. D. O'Connor
ATTORNEY

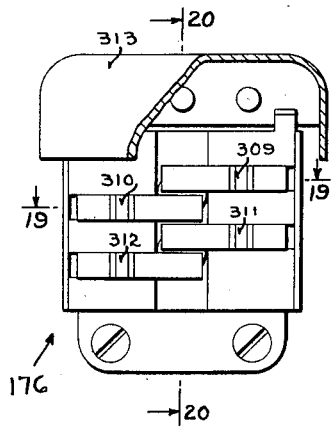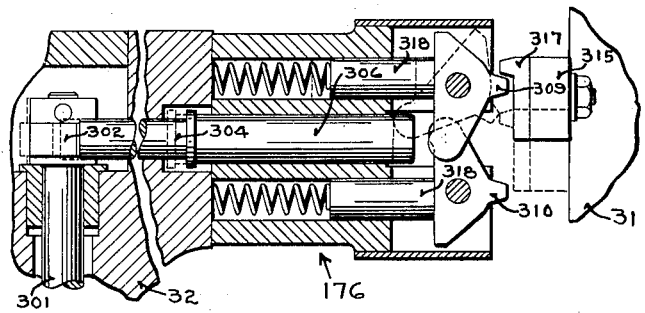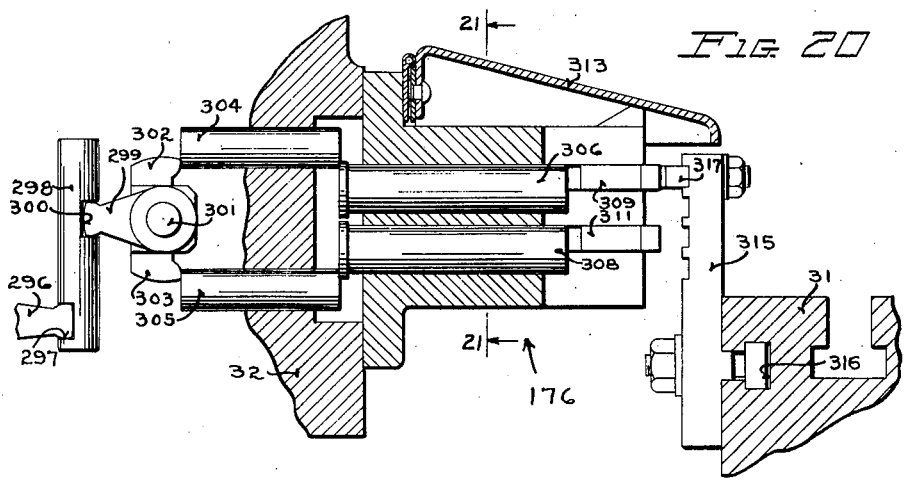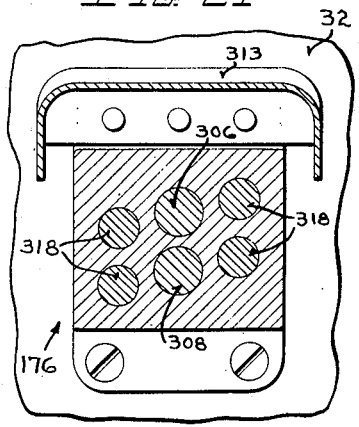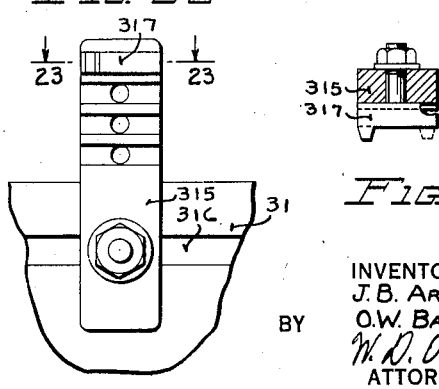

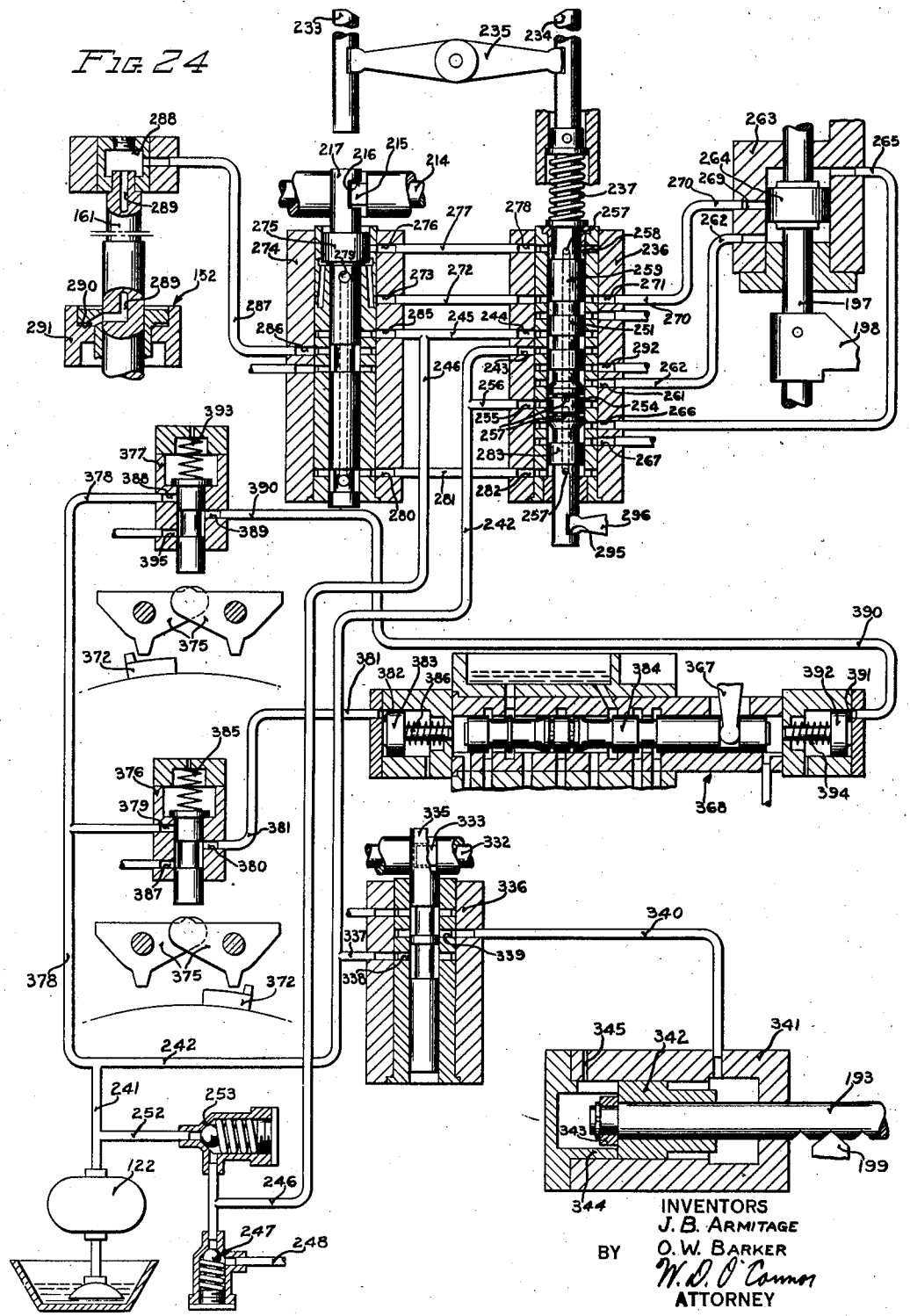

Aug. 25, 1942.   J. B. ARMITAGE ET AL   2,293,880
MACHINE TOOL TRANSMISSION AND CONTROL MECHANISM
Filed July 22, 1938   12 Sheets-Sheet 12
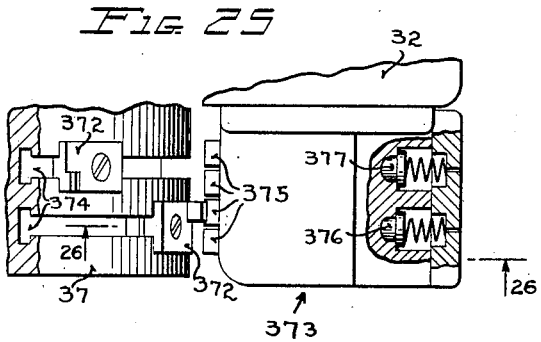
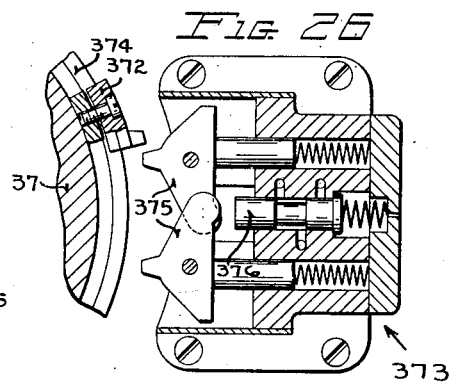
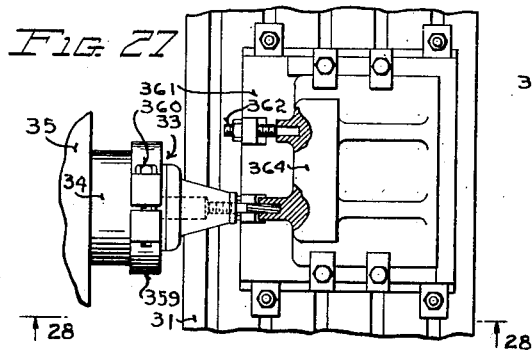
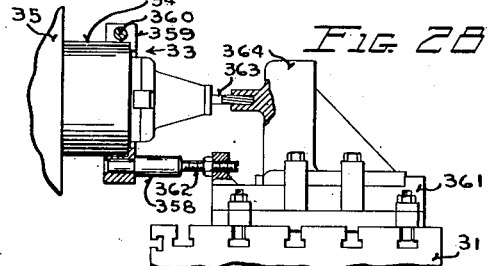
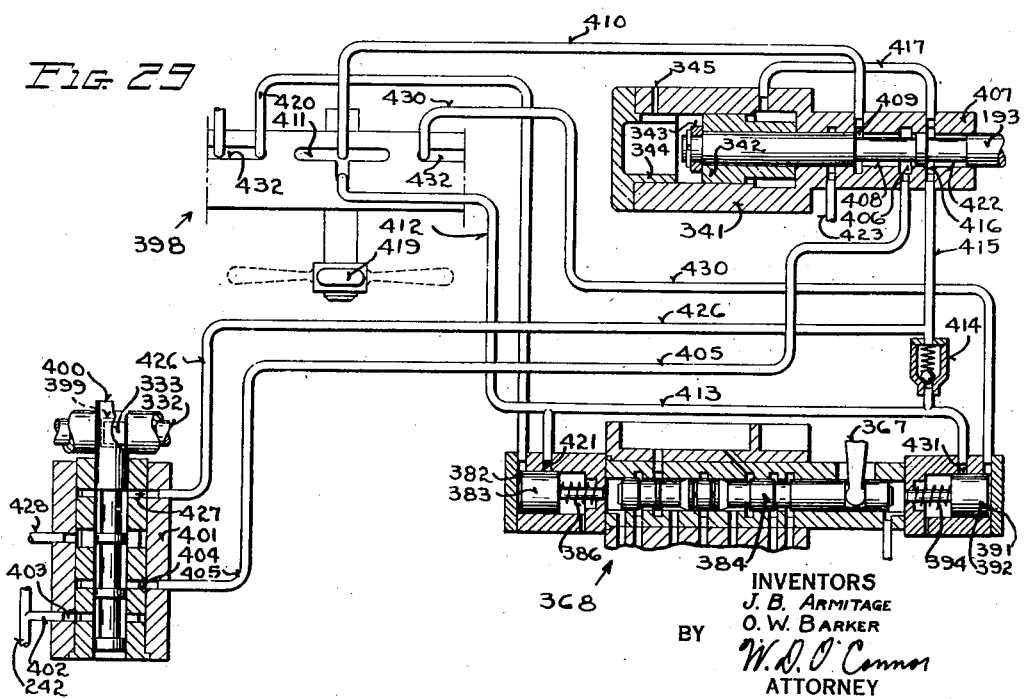
INVENTORS
J. B. ARMITAGE
O. W. BARKER
BY
W. D. O'Connor
ATTORNEY Patented Aug. 25, 1942

2,293,880

UNITED STATES PATENT OFFICE 2,293,880

MACHINE TOOL TRANSMISSION AND CONTROL MECHANISM

Joseph B. Armitage, Wauwatosa, and Orrin W. Barker, Milwaukee, Wis., assignors to Kearney & Trecker Corporation, West Allis, Wis., a corporation of Wisconsin Application July 22, 1938, Serial No. 220,648

27 Claims. (Cl. 90—11)

This invention relates generally to improvements in machine tools and more particularly to improved actuating and controlling mechanisms for effecting and for regulating and coordinating the movements of cooperating machine tool parts.

A general object of the invention is to provide an improved transmission mechanism and controlling apparatus for actuating and for automatically controlling and correlating the movements of various movable elements of a machine tool.

Another object of the invention is to provide improved control means for precisely positioning a movable element of a machine tool, positively and with a high degree of accuracy.

Another object of the invention is to provide a machine tool capable of automatically executing a cycle of operations including the successive machining of a plurality of surfaces disposed at different precisely predetermined levels.

Another object of the invention is to provide an improved control system for the power driving mechanism of a machine tool movable member, that is responsive to an overload condition and is operative thereupon to completely disconnect the power driving mechanism from the movable member.

A more specific object of the invention is to provide in a machine tool transmission and control mechanism, a power driving connection for actuating a movable element including a torque limiting device together with control means responsive to functioning of the torque limiting device for disconnecting the power driving mechanism from the movable element.

Another object of the invention is to provide in a machine tool, a plurality of individually adjustable positive stop members arranged to be moved successively into register with a movable element of the machine for stopping it selectively at any one of a series of predetermined positions.

Another object of the invention is to provide improved control mechanism for coordinating the movements of a plurality of machine tool parts, that functions in response to stopping of one part of the machine at a predetermined position for changing the mode of operation of another part.

Another object is to provide an improved machine tool control system including trip mechanism responsive to movement of one supporting element of the machine for controlling the movements of another supporting element.

Another object is to provide a machine tool control system including a positive stop device for precisely positioning one movable element of the machine, and apparatus responsive to the stopping of the element by the positive stop device and operative to start another movable element of the machine.

Another object is to provide a machine tool driving transmission mechanism including two torque limiting devices and control means responsive to slipping of either device for automatically disengaging the driving mechanism.

Another object is to provide an improved hydraulic control system for regulating and coordinating the movements of machine tool elements.

A further object is to provide an improved adjustable positive stop member for precisely positioning a movable element of a machine tool.

According to this invention, a machine tool is provided with improved actuating and controlling mechanism for effecting automatic regulation and coordination of the movements of a plurality of supporting elements in a manner to provide for automatically executing a series of cutting operations. One feature of the invention consists in the provision of an adjustable positive stop device for precisely positioning a power driven element of the machine, and associated control mechanism including torque limiting apparatus functioning in response to stopping of the movable part by the positive stop device to disconnect the power driving mechanism and to effect various subsequent movements as desired, such as starting or reversing the direction of movement of another part. The two or more movable parts of the machine may each be arranged for automatic operation in response to its own movement and also in response to movement of the other part. In the particular construction and arrangement of parts disclosed herein as a preferred embodiment of the invention, a milling machine is provided with a spindle supporting quill or ram arranged for bodily movement relative to a movable work supporting table. The quill is arranged to be moved either at feed rate or at rapid traverse rate, and there is provided a torque limiting device for each rate of movement, the arrangement being such that upon engagement of a positive stop to precisely position the quill, one or the other of the torque limiting devices will slip and operate the control mechanism in manner to disengage the drive. The quill is further controlled by trip mechanism functioning in response to its movement and by trip mechanism functioning in response to movement of the table. Furthermore, the table is controlled by trip mechanism in the usual manner and also by trip mechanism responsive to movement of the quill, there being also an interconnection between the table controlling mechanism and the quill controlling mechanism whereby the table may be started or reversed upon functioning of a torque limiting clutch in the quill driving mechanism when the positive stop is engaged. The positive stop device may include an adjustable element on the quill for engaging an abutment carried by the supporting structure, or it may take the form of a plurality of adjustable abutments carried by the table for successive engagement by the quill. The control mechanism for controlling the movements of the quill and of the table in response to the various interconnected tripping mechanisms, is preferably hydraulically actuated and may be so adjusted as to provide various automatic cycles of operations each including several alternate and coordinated movements of the quill and the table for effecting different cutting operations at accurately predetermined positions on a workpiece.

The foregoing and other objects of this invention, which will become more fully apparent from the following detailed specification, may be achieved by the particular apparatus constituting an exemplifying embodiment of the invention that is depicted in and described in connection with the accompanying drawings, in which:

Figure 1 is a view in left side elevation of a milling machine exemplifying the type of machine tool in which the invention may be embodied in practical form, parts of the machine frame having been broken away to show the table driving mechanism;

Fig. 2 is an enlarged view in longitudinal section of an adjustable positive stop member threaded on the quill feeding screw of the machine, taken along the plane represented by the line 2—2 in Fig. 1;

Fig. 3 is a view in front elevation of the milling machine shown in Fig. 1, with parts broken away to show the table moving and controlling mechanism;

Fig. 4 is an enlarged fragmentary view in vertical section of an improved table locking device, taken substantially along the plane represented by the line 4—4 in Fig. 3;

Fig. 5 is a view generally in horizontal section through the spindle carrying head of the machine, taken substantially along the planes represented by the line 5—5 in Fig. 1;

Fig. 6 is a view in vertical section through the spindle carrying head longitudinally of the quill, taken substantially along the plane represented by the line 6—6 in Fig. 3;

Fig. 7 is an enlarged fragmentary view of an anti-friction bearing adjusting device on the spindle drive shaft, taken in transverse section along the plane represented by the line 7—7 in Fig. 6;

Fig. 8 is a view in elevation of an adjustable sleeve bearing which supports the spindle quill as shown in longitudinal section in Fig. 6;

Fig. 9 is an expanded, partially diagrammatic view, taken generally in vertical section, showing the drive mechanisms for rotating the spindle and for effecting axial movements of the spindle quill;

Fig. 10 is a view, partly in left side elevation and partly in vertical section, of the quill controlling trip mechanism on the spindle supporting column, taken generally along the plane represented by the line 10—10 in Fig. 3;

Fig. 11 is a fragmentary view of part of the spindle quill controlling mechanism, taken in vertical section generally along the plane represented by the line 11—11 in Fig. 1;

Fig. 12 is a similar fragmentary view of another part of the spindle quill controlling mechanism, taken largely in vertical section generally along the plane represented by the line 12—12 in Fig. 1;

Fig. 13 is an enlarged view in horizontal section of a part of the quill driving and controlling mechanism taken substantially along the plane represented by the line 13—13 in Fig. 10;

Fig. 18 is an enlarged view in front elevation of the table actuated quill controlling trip mechanism which appears in Fig. 3, part of the cover having been broken away;

Fig. 19 is a detailed view in horizontal section of the table actuated quill controlling trip mechanism and an associated table dog, taken along the planes represented by the line 19—19 in Fig. 18;

Fig. 20 is a detailed view in vertical section of the trip mechanism taken along the plane represented by the line 20—20 in Fig. 18;

Fig. 21 is another detailed view in vertical section taken along the plane represented by the line 21—21 in Fig. 20;

Fig. 22 is a detailed face view in elevation of the table mounted trip dog post shown in side elevation in Fig. 20;

Fig. 23 is a detailed view in horizontal section through the trip dog post taken along the plane represented by the line 23—23 in Fig. 22;

Fig. 24 is a schematic circuit diagram of a hydraulic control system associated with the quill controlling trip mechanisms;

Fig. 25 is an enlarged detailed view, partly in horizontal section, of quill actuated table controlling trip mechanism taken generally along the planes represented by the line 25—25 in Fig. 1;

Fig. 26 is another detailed view of the table controlling trip mechanism taken in vertical section along the planes represented by the line 26—26 in Fig. 25;

Fig. 27 is a fragmentary view, partly in plan and partly in horizontal section, of parts of the spindle quill and of the work table, showing a modified multiple positive stop device for the spindle quill, associated with a work holding fixture on the table;

Figure 14:
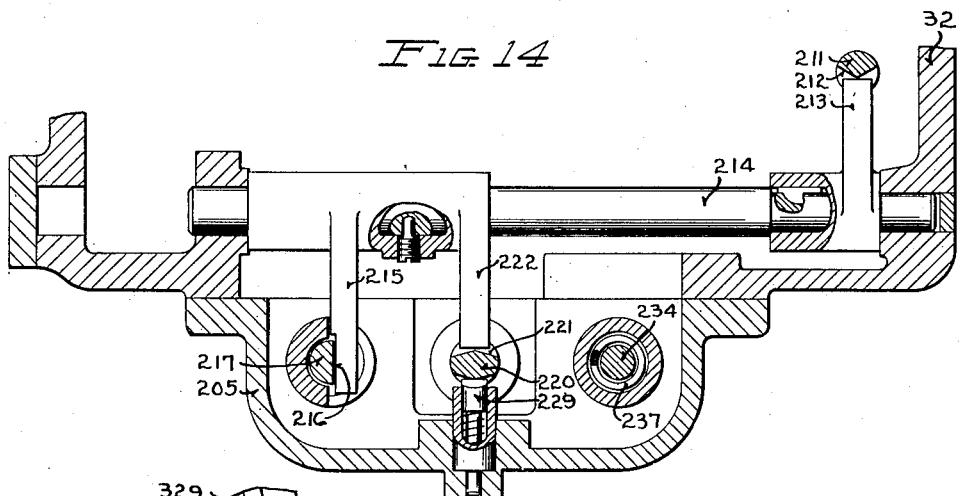
Fig. 14 is a detailed view in horizontal section of a part of the quill controlling mechanism, taken along the plane represented by the line 14—14 in Fig. 10.

Fig. 28 is another fragmentary view of the modified quill stopping device partly in elevation and partly in vertical section taken generally along the plane represented by the line 28—28 in Fig. 27, and Fig. 29 is a schematic circuit diagram of a modified hydraulic control system associated with the quill controlling and table controlling trip mechanisms for actuating them in response to functioning of the quill driving torque limiting devices.

The particular machine tool illustrated in the drawings as exemplifying apparatus of the class adapted to be constructed and operated in accordance with the principles of the present invention, is primarily a milling machine of the bed type, although it is to be understood that the invention may be applied with equal advantage to other machines of different construction.

Referring more specifically to the drawings and particularly to Figs. 1 and 3 thereof, the milling machine there generally depicted, in left side and in front elevation respectively, incorporates a practical operative embodiment of this invention that is fully described herein by way of example. As there shown, the structure comprises essentially a hollow bed or base 30 constituting the foundation or frame of the machine and forming a housing for the driving mechanism for actuating the various movable parts of the apparatus, such as the carriages or supports that carry the workpiece and the cutting tool. Carried on the upper surface of the base 30 adjacent to its forward edge is a movable work supporting table 31 that in this type of machine is slidably mounted for horizontal longitudinal reciprocating movement in a supporting saddle fixed on the machine bed in well known manner. Behind the table 31 and closely adjacent to it a pair of uprights are rigidly mounted on the bed 30 to constitute an upstanding tool supporting column structure 32 which carries a rotatably mounted and bodily movable cutter carrying spindle 33 arranged to support a rotary cutting tool in adjustable cooperative relationship with a workpiece on the work table 31.

To provide for bodily movement of the cutting tool carrying spindle 33 horizontally and vertically in a plane transverse to the table 31, the spindle is rotatably supported in a slidably mounted quill or ram 34 that is carried by and arranged for horizontal endwise movement within supporting spindle block or head 35 which is in turn slidably mounted for vertical movement between the uprights of the column 32. The spindle block 35 also carries the usual overarms 36 which are slidably mounted therein parallel to and above the quill 34.

The work supporting table 31 is arranged to be reciprocated by power along the bed 30 in well known manner, the direction and rate of its movement being under the control of tripping mechanism, shown in Fig. 3, that functions automatically in response to movement of the table, preferably in accordance with the invention set forth in Patent No. 2,007,434 issued April 29, 1937, to Fred A. Parsons and assigned to Kearney & Trecker Corporation. Likewise, in this machine, the quill 34 carrying the spindle 33 is arranged for movement by power, the direction of power movement being axial of the spindle and transverse to that of the table 31. Control of the power axial movement of the quill 34 is likewise effected automatically, a quill actuated control drum 37 being provided on the side of the column 32 for carrying trip dogs which cooperate with trip mechanism generally similar in operation to the trip mechanism disclosed in the copending application of Joseph B. Armitage, Serial No. 86,559 filed June 22, 1936 and entitled, Machine tool which issued September 24, 1940, as Patent No. 2,215,684. Furthermore, the control drum 37 may also carry other trip dogs which function to control the movements of the table 31 in accordance with the position of the quill 34, for effecting coordinated action therebetween, and conversely there is also provided a trip mechanism responsive to movement of the table 31 for automatically controlling movements of the quill 34.

In accordance with an important feature of this invention, movement of the quill 34 in the forward or outward direction may be stopped at a precisely predetermined position by means of an adjustable positive stop device 38, whereupon control mechanism associated with the quill trip apparatus and responsive to the occurrence of an overload condition functions to disconnect the quill driving mechanism. The control mechanism may also be arranged to cause reversal and withdrawal of the quill 34, preferably at rapid traverse rate, upon engagement with the positive stop, and as a modification the apparatus may be arranged to control the movement of the table 31. As a further modification, several positive stop abutments may be carried on the table for selective engagement by the quill.

Movement of the spindle block 35 vertically within the column 32 to adjust the vertical position of the spindle 33 may be accomplished in well known manner by means of a manually operated screw and nut mechanism (not shown), the block then being clamped between the two uprights of the column in its adjusted position by means of clamp bolts 39 which extend horizontally through the spindle block and are provided at their inner ends with heads that slidably engage vertical T slots 40 in one of the uprights, as shown in Fig. 5. Likewise, the quill 34 may be clamped in the spindle block 35 by means of clamps actuated by screws 41, and the overarms 36 may be clamped in the block by means of clamps actuated by screws 42 or in any other convenient manner.

As appears in Fig. 6, the spindle carrying quill 34 is carried in the spindle block 35 for longitudinal sliding movement therein, by means of a pair of adjustable sleeve bearings 43 disposed respectively at the ends of the block and arranged to closely engage the quill for slidably supporting it rigidly in manner to permit accurate axial adjustment thereof transversely of the table 31. Referring to Fig. 8 showing one of the adjustable bearing sleeves 43 in elevation, it may be seen that the quill engaging portion of the bearing is of tapered frusto-conical shape for fitting a complementary tapered socket in the spindle block. To provide for adjusting the bearing, the tapered quill engaging portion of the sleeve is provided with a plurality of longitudinal slots 44 angularly spaced about its periphery, only one slot being shown in the drawing. As shown, each longitudinal slot 44 extends to and intersects the center of an arcuate circumferential slot 45 extending part way around the base of the conical portion, thereby freeing a large part of the quill engaging sleeve for resilient radial movement in effecting adjustment of the bearing. As shown in Fig. 6, each bearing sleeve 43 is fitted in the spindle block by means of shims and retaining screws 46, the arrangement being such that each bearing sleeve is drawn into its conical seat a sufficient distance to contract the resilient slotted portions thereof enough to effect the desired sliding fit or degree of engagement with the quill 34.

Longitudinal movement of the quill 34 is effected by means of a screw threaded rod 47 (Fig. 5) one end of which is fixed in a bracket or housing 48 secured to the rearwardly projecting end of the quill, the other end extending forward through an opening in the spindle block 35. Within the spindle block, the threaded rod 47 is engaged by a rotatably mounted internally threaded driving nut 49 which is journaled therein in a manner preventing endwise movement. As shown, the nut 49 is provided with an integrally formed bevel gear 50 which meshes with a cooperating bevel gear 51 on the inner end of an actuating shaft 52 that extends horizontally through the spindle block and the side of the column and is provided on its outer projecting end with means for receiving a crank (not shown) for turning the shaft 52 and the nut 49 to move the quill 34 manually. Meshing with the bevel gear 50 on the nut 49 is a bevel gear 53 carried by a stub shaft 54 which has at its other end another bevel gear 55 meshing with a bevel gear 56 that slidably engages a vertically disposed splined shaft 57. The shaft 57 extends upwardly in manner to project from the top of the column 32 as shown in Figs. 1 and 3, thereby providing another projecting end for engagement by the manually operated crank, and it also extends downwardly from the spindle block to effect a driving connection (shown in Figs. 9 and 12) by means of which the quill 34 may be moved by power.

The positive stop device 38 for limiting the forward movement of the quill 34 is in this instance constituted by a nut adjustably threaded on the quill moving rod 47 in position to engage an abutment 61 constituted by the bottom of a countersunk opening in the spindle block 35, when the quill 34 is advanced to the predetermined position. As shown in the enlarged view Fig. 2, the positive stop nut 38 includes a primary nut element 62 which is threaded on the rod 47 in position to engage the abutment 61 and is provided on its periphery with notches 63 for receiving a wrench or the like for turning it to adjust its position. In order to maintain the primary nut 62 in adjusted position, there is provided a secondary or locking nut 64 likewise threaded on the rod 47 and provided with external notches 65 by means by which it may be turned into locking engagement with the primary nut 62. To further insure against movement of the positive stop nut out of its adjusted position, the locking nut 64 is provided with a rearwardly extending tapered portion which is split to provide resiliency and externally threaded, as appears in Fig. 2. The tapered resilient portion of the nut 64 is engaged by an internally threaded tapered clamping ring nut 66 having peripheral notches 67 by means of which it may be tightened upon the locking nut 64 to tightly clamp it to the rod 47. By means of this adjusting and clamping arrangement, the positive stop element 38 may be so positioned and securely clamped on the rod 47 that it may be repeatedly engaged with the abutment 61 in the spindle block without changing the adjustment, in stopping the quill 34 when it is moved forward to the selected precisely predetermined position at which a cutting tool in the spindle 33 will engage a workpiece on the table 31 in an accurately predetermined plane.

The spindle 33 is provided at its forward or outward end with a tool receiving nose or socket 71, and at its inner end it carries a relative large driving gear wheel 72, as shown in Fig. 6, by means of which it may be rotated to effect rotary movement of a cutting tool. The main or forward portion of the spindle is rotatably mounted in the quill 34 by means of a pair of spaced opposed anti-friction bearings 73 and the rear end is supported beyond the gear 72 by an anti-friction bearing 74 carried in the housing 48 on the end of the quill.

The housing 48 also supports a pinion 75 meshing with the gear 72, the pinion in this instance being formed on the surface of a sleeve 76 that is journaled at its ends in anti-friction bearings 77 in the housing. The sleeve 76 also carries a relatively heavy flywheel 78 preferably formed largely of lead, that serves as a steadying or stabilizing element to provide a steady uniform flow of power to the spindle 33 and to prevent torsional vibration of the spindle and its cutting tool. The sleeve 76 is internally splined for sliding engagement with a complementary splined driving shaft 79 which is journaled in and extends rearwardly from the spindle block 35 beneath and parallel with the quill 34. The gear wheel 72 and its meshing pinion 75 on the sleeve 76 constitute a range changing gear train that determines the speeds at which the spindle 33 may be operated, the gear ratio being so selected as to provide the desired speed range. By reason of the fact that the flywheel 78 is associated with the driving pinion 75, its speed of rotation is not affected by a change in the gear ratio between the pinion 75 and the gear wheel 72. Accordingly, the steadying effect of the flywheel 78 is available even though the spindle is being driven slowly, and likewise the flywheel effect is not so excessive as to make it difficult to control the spindle when range change gears of a ratio to drive the spindle at high speeds are utilized.

To prevent the quill 34 from turning within the spindle block 35 under the influence of the reaction torque resulting from a cutting operation, there is provided an upwardly extending torque arm 81 formed integrally with the housing 48 on the quill and disposed with its upper end in sliding engagement with a groove 82 in the lower side of a bracket 83 which is secured to and projects rearwardly from the spindle block 35, the arrangement being such that the arm 81 may slide along the groove 82 in the bracket when the quill is moved axially, while at the same time preventing turning movement of the quill within the spindle block. As appears in Fig. 1, the bracket 83 is so shaped as to constitute also a protective housing or cover over the parts of the quill and the overarms that may project rearwardly from the spindle block 35.

The splined spindle driving shaft 79 engages at its forward end within the spindle block 35 with a bevel gear 85 which meshes with a cooperating bevel gear 86 on the upper end of a vertically disposed splined driving shaft 87 that is carried by the spindle block and projects downwardly into the base of the machine for the purpose of effecting sliding driving connection with the power operated mechanism housed therein. As appears in Fig. 6, the spindle driving splined shaft 79 extends through and is keyed in an extended hub portion 90 of the gear 85 that is rotatably supported in the spindle block 35 by means of tapered anti-friction bearings 91 and 92. The bearings cooperate to rotatably support the shaft 79 and to prevent endwise movement of the bevel gear 85 and in order to maintain it in proper meshing relationship with the bevel gear 86. To provide for adjusting the bearings 91 and 92, the inner cone element of the bearing 91 is engaged in abutting relationship by a spacing collar 93 which is in turn engaged by an adjusting nut 94 that is threaded on the extended hub portion 90 of the gear 85. When the nut 94 is tightened, it forces the collar 93 against the cone of the bearing 91 in manner to tighten the bearings 91 and 92 against each other.

To prevent the nut 94 from turning accidentally after the bearings have been adjusted, both the nut 94 and the spacing collar 93 are provided on their peripheries with external serrations 96, as best shown in Fig. 7, the serrations being similar in shape and adapted to be engaged simultaneously by complementary internal serrations 97 on the inner surface of a locking collar 98. The spacing collar 93 and the cone of the bearing 91 are both slidably keyed by means of a key 99 to the extended hub 90 of the gear 85 in manner to permit axial adjusting movement therealong but preventing relative rotation. With the locking collar 98 engaging the serrations of both the spacing collar 93 and the nut 94, as shown in Fig. 6, the nut 94 is positively prevented from rotating relative to the spacing collar and the gear hub 90. In order to adjust the bearing, the locking collar 98 is moved axially to disengage it from the serrations of the spacing collar 93, after which the nut 94 may be turned either directly or by means of the locking collar 98. In completing the adjustment, the serrations on the nut 94 are moved into alignment with the serrations on the spacing collar 93 and the locking collar 98 is then moved to the position shown in Fig. 6 for engaging the serrations of both the nut and the spacing collar.

In order to retain the locking collar 98 in locking position, there is provided a spring ring or G-spring 101 which encircles the collar 98 and is fitted in a groove 102 in the periphery thereof. The spring ring 101 is provided at one end with an inwardly projecting key portion 103 that extends through a hole in the locking collar 98 and into a groove 104 formed between the adjusting nut 94 and the spacing collar 93. In order to withdraw the locking collar 98 to adjust the bearing, it is first necessary to disengage this retainer by lifting the end portion of the spring 101 a sufficient distance to withdraw the key member 103 from the groove 104. Upon the locking collar being replaced after adjusting the bearing, the spring ring 101 forces its inwardly projecting key portion 103 downward into the groove 104 in manner to retain the locking collar in the locking position. This arrangement for adjusting an anti-friction bearing is fully set forth and claimed in co-pending application Serial No. 301,355, filed October 26, 1939, as a continuation in part of the present application.

The mechanism for driving the table 31 with reciprocating movement transversely of the cutter spindle 33 includes a table screw 110 (Fig. 3) which is rotatably mounted at its ends in brackets depending from the ends of the table and is threaded in a stationary nut fixed in the bed 30 in well known manner. The screw 110 may be rotated selectively in either direction by reverse driving gearing 111 that may be operated at feed rate by a worm gear 112 (Fig. 1) which is driven by means of a pick-off gear change speed box 113 at the front of the machine, the speed box being driven by a feed shaft or main driving shaft 114 which extends back into the bed 30. For driving the table at rapid traverse rate, the reverse gear mechanism 111 may be driven alternatively by a bevel gear set 115 that is connected with a rapid traverse shaft 116 also extending back into the housing 30 for connection with the power operated mechanism therein.

As shown in the expanded sectional view Fig. 9, the driving mechanism in the back of the housing 30 includes a drive pulley 119 that is adapted to be belt driven by means of an electric motor or other suitable power source and that is rotatably mounted in a pulley bracket 120 fixed to the rear wall of the housing 30 in axial alignment with the main shaft 114. The pulley 119 is operatively connected by a gear train 121 directly to the rapid traverse shaft 116 in such manner that rapid traverse movement of the table 31 may be effected at any time that the pulley 119 is operating. There are also provided in the pulley bracket 120 a pump 122 and a pump 123 both driven from the rapid traverse shaft 116 and operative to provide sources of lubricating oil under pressure for lubricating the mechanisms and for supplying pressure fluid to the hydraulic control systems associated with the spindle quill and the work supporting table of the machine respectively.

As shown in Fig. 9, the driving pulley 119 may be selectively connected to the main driving shaft 114 by means of a hydraulically actuated clutch 124 mounted within the pulley. The clutch 124 controls the feeding movements of the table 31 and likewise controls the driving mechanism for rotating the spindle 33 and the mechanism for moving the quill 34 in power feeding or rapid traverse movements. The tool spindle 33 is driven from the main shaft 114 by means of a reversing and disconnecting mechanism shown in Fig. 9 and including a pair of opposed bevel gears 126 and 127 rotatably mounted on the shaft 114 and adapted to be operatively connected to it selectively by means of a reversing clutch collar 128 slidably keyed on the shaft between them. The bevel gears 126 and 127 mesh with a bevel gear 129 for turning it in one or the other direction and the gear 129 is connected by spur gearing 130 to a bevel gear 131 that meshes with a bevel gear 132 having splined connection with the vertically disposed spindle driving splined shaft 87 shown in Fig. 6, the arrangement being such that the spindle head 35 and the shaft 87 may move vertically relative to the base 30 without interfering with the driving connection.

The transmission mechanism for effecting feeding movements and rapid traverse movements of the quill 34 across the table 31 is also driven from the main shaft 114 independently of the table feeding drive, as shown in Fig. 9, although under some circumstances it may be desirable to connect the rapid traverse drive for the quill to the rapid traverse shaft 116 in order that the quill may be moved at rapid traverse rate when the main clutch 124 is disengaged for the purpose of disconnecting the spindle drive mechanism. As shown, the main shaft 114 carries a spur gear 136 that meshes with an idler gear 137 which in turn drives a gear 138 on the forward end of a horizontal shaft 139 journaled in the bed 30 beneath the column 32. At its other end, the shaft 139 carries a bevel gear 140 that meshes with a similar bevel gear 141 on the lower end of a vertical shaft 142 extending upward within the column 32.

The shaft 142 is connected to a feed train by means of a bevel gear 143 secured to its upper end and meshing with a bevel gear 144 on a horizontal stub shaft 145 that extends rearwardly into a feed change pick-off gear box 146 inclosed beneath a cover 147 on the back of the column. From the pick-off gear mechanism 146 power is transmitted at a selected feed rate through a horizontal feed shaft 148 to a torque limiting device or overload trip safety clutch 149 that is adapted to slip upon application of torque or force in excess of a predetermined maximum, such as occurs when the positive stop nut 38 engages the abutment 61 in stopping forward feeding movement of the quill at a predetermined position. The safety clutch 149 is connected by means of a worm and worm wheel drive 150 to a feed element 151 at one end of hydraulically actuated feed and rapid traverse clutch mechanism 152. The clutch mechanism 152 is provided at its other end with a rapid traverse element 153 having fixed thereon a gear element 154 which is directly driven by a gear 155 mounted on the vertical driving shaft 142 and connected thereto by another torque limiting device or safety clutch 156 arranged to limit the torque which may be applied in moving the quill at rapid traverse rate to a predetermined maximum value.

The hydraulically actuated feed and rapid traverse clutch device 152 is similar to that shown in the previously mentioned co-pending application of Joseph B. Armitage, Serial No. 86,559, now Patent No. 2,215,684, and it is so arranged that either the feed rate driving element 151 or the rapid traverse rate driving element 153 may be operatively connected to a vertically disposed quill driving shaft 161 that extends through and supports the clutch device 152 and its associated driving gearing. As more fully explained in the co-pending application, the feed driving torque is transmitted from the clutch mechanism 152 to the shaft 161 by means of an over-running clutch device 162, and the rapid traverse driving torque is alternatively transmitted to the shaft 161 by means of a friction clutch 163 that effects a direct connection from the gearing driven by the shaft 142 to the shaft 161, causing the clutch 162 to over-run the feed driving train.

The quill feeding shaft 161 carries at its lower end a gear 165 that meshes with a clutch gear 166 which is rotatably mounted on a sleeve 167 journaled in the column parallel with the shaft 161. Another gear 168 on the shaft 161 meshes with an idler gear 169 which in turn drives another clutch gear 170 also rotatably mounted on the sleeve 167, the arrangement being such that the clutch gears 166 and 170 turn in opposite directions. Between the clutch gears 166 and 170 a clutch spool 171 is slidably splined on the sleeve 167 in manner to be moved into engagement alternatively with either of the clutch gears for connecting them selectively to the sleeve 167 in order to drive it in either one or the other direction. The sleeve 167 encircles and is keyed to the lower end of the splined shaft 57 which is journaled in the column 32 and constitutes the power driving connection to the quill moving mechanism in the vertically movable spindle head 35, as previously explained, the splined connection between the shaft 57 and the bevel gear 56 carried by the spindle head providing for vertical movement of the head without interfering with the driving connection.

Manual movement of the quill 34 may be effected, as previously explained, by means of a hand crank applied either to the projecting upper end of the shaft 57 or to the projecting outer end of the shaft 52, whichever may be most convenient. Manual control of quill movement by power operation of the shaft 57 may be effected by means of a hand lever 175 mounted at the top of the column and arranged to control both the direction and the rate of movement of the quill. Automatic control of power movement of the quill may be effected by means of trip dogs on the drum 37 or by trip dogs on the back of the table 31 cooperating with a trip mechanism 176, the control mechanism being also connected to both the feed torque limiting device 149 and the rapid traverse torque limiting device 156 in manner to automatically disengage the quill driving clutch 171 whenever the forward movement of the quill is stopped by the positive stop nut 38 engaging the abutment 61.

The control drum 37 is mounted on the left side of the column 32, as shown in Figs. 1 and 10, and is operatively connected to turn in synchronism with the movements of the quill by being directly driven from the upper end of the vertical quill driving shaft 57, as shown in Fig. 11. As there shown, a spur gear wheel 178 is fixed on the upper end of the shaft 57 in position to mesh with a gear wheel 179 on the upper end of a parallel vertical shaft 180. The shaft 180 is provided at its lower end with a worm 181 that meshes with a worm wheel 182 on a horizontal shaft 183 that is journaled in a bracket 184 mounted in the side of the column 32 in manner to present a flange 185 at its outer end to which the control drum 37 is secured by cap screws 186, the driving arrangement being such that the drum 37 is driven at the speed and in the direction corresponding with the speed and direction of movement of the quill.

Figure 16:
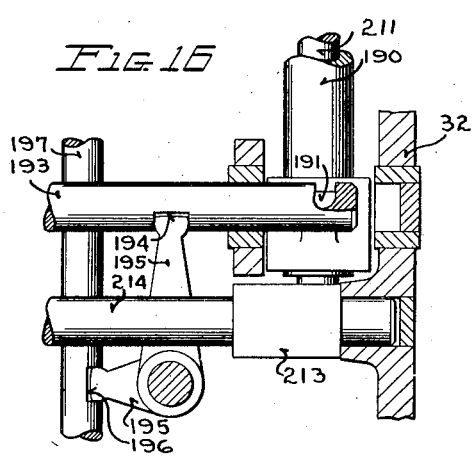
Fig. 16 is another detailed view in vertical section taken along the plane represented by the line 16—16 in Fig. 13.

Manual control of the direction of movement of the quill under power is effected by moving the hand lever 175 in a horizontal plane to the right or to the left as the case may require thereby turning a vertically disposed tubular control shaft 190 to which the lever 175 is connected and that extends down into the column as shown in Fig. 10. The control shaft 190 is provided at its lower end with a crank arm 191 as appears in Figs. 10, 13 and 17, the outer end of the arm 191 being engaged in a groove 192 in a horizontally disposed quill reversing clutch control rod 193, the rod being movable endwise upon horizontal swinging movement of the lever 175. As best shown in Fig. 16, the rod 193 is provided in its lower surface with a notch 194 which engages one arm of a bell crank 195, the other arm of which engages a notch 196 in a vertically disposed clutch shifting rod 197. As appears in Fig. 12, the clutch shifting rod 197 is provided near its lower end with a shifting fork 198 that engages the reversing clutch spool 171, the arrangement being such that upon sidewise swinging movement of the hand lever 175, the rod 197 is moved vertically by the bell crank 195 in manner to move the clutch spool 171 either into engagement with the clutch gear 166 or the clutch gear 170, or to a neutral intermediate position in which the power driving mechanism is disconnected from the quill moving mechanism. In order to retain the clutch 171 in any one of its three positions, the horizontal control rod 193 is provided with three corresponding detent notches as shown in Fig. 13 which are arranged to be engaged selectively by a spring pressed detent member 199.

Movement of the quill by power may be stopped automatically by means of stop dogs 202 that are adjustably positioned on the face of the control drum 37, as shown in Figs. 1 and 10, and are adapted to engage and turn a tripping or control sleeve 204 that is rotatably supported in the top of a control unit 205 mounted on the side of the column beneath the drum 37. As shown in Figs. 12 and 13, the control sleeve 204 is of tubular shape and is provided on its lower end within the control unit 205 with an inwardly extending arm 206 that engages a notch 207 in the side of the horizontal control rod 193, the arrangement being such that when the sleeve 204 is turned about its axis the rod 193 is moved endwise in manner to shift the clutch 171.

The tripping sleeve 204 is provided at its upper end with tripping arms or abutments 208 extending outwardly from opposite sides thereof and disposed parallel with the face of the drum 37 when the clutch 171 and the rod 193 are in neutral positions as shown in Figs. 12 and 13. When the clutch is moved into engagement with either clutch gear, one of the tripping arms 208 on the sleeve 204 is turned toward the drum 37 into the path of movement of the stop dogs 202.

When the inwardly turned arm 208 is engaged by a stop dog 202 it is forced outwardly and the tripping sleeve 204 is turned in direction to move the control rod 193 and the clutch 171 to the central neutral position thereby disconnecting the power transmission mechanism from the quill moving mechanism and stopping the quill. To prevent excessive movement of the quill in the event that the stop dogs 202 have been removed, the drum is provided with permanently attached limiting stop dogs 209.

Figure 17:
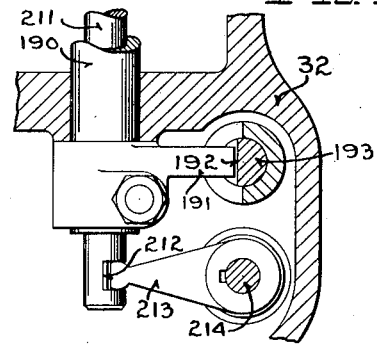
Fig. 17 is a further detailed view in vertical section taken along the plane represented by the line 17—17 in Fig. 10.

For controlling the rate of movement of the quill 34, the control lever 175 is arranged to be moved vertically regardless of its horizontal position. As shown in Fig. 10, the lever 175 is pivotally mounted in a bracket 210 that is secured to and extends radially from the hollow control shaft 190, the arrangement being such that the lever is free to pivot in a vertical plane but is connected to turn the shaft 190 when it is moved horizontally. The inner end of the pivoted lever 175 engages the upper end of a control rod 211 that is slidably mounted for vertical movement within the hollow shaft 190. At its lower end the rod 211 is provided with a notch 212 as shown in Figs. 10, 14 and 17 that engages the end of a crank arm 213 which is keyed to a horizontally disposed rock shaft 214. The rock shaft 214 is provided at its other end with a forwardly projecting arm 215 that engages at its outer end with a notch 216 in the upper end of a rapid traverse valve plunger 217 as shown in Figs. 10 and 14. The arrangement of the mechanism is such that when the outer end of the lever 175 is moved upward about its pivot axis, the rod 211 is moved downward and turns the shaft 214 in manner to move the valve plunger 217 upward. This causes the valve plunger 217 to admit pressure fluid from the pump 122 into the feed and rapid traverse clutch mechanism 152 to engage the friction clutch 163 for connecting the rapid traverse drive mechanism to the quill driving train.

Movement of the valve plunger 217 may also be effected by means of a tripping post 220 that is slidably mounted for vertical movement within the tubular tripping sleeve 204 as shown in Figs. 10, 12 and 14. The vertically movable tripping post 220 is provided at its lower end with a notch 221 which engages the forward end of an arm 222 secured to the rock shaft 214, the post 220 being connected for turning movement with the sleeve 204 by means of a pin 224 passing through the post 220 and slidably fitted in slots in the sleeve 204. When the sleeve 204 is turned in engaging the quill driving clutch 171, the post 220 is likewise turned to move one or the other of two tripping lugs or abutments 225 and 226 into the path of movement of either a feed dog 227 or a rapid traverse dog 228 that may be adjustably positioned on the face of the drum 37. For example, if the rapid traverse dog 228 engages the lug 225, the post 220 is moved upward thereby moving the valve plunger 217 upward and engaging the rapid traverse clutch. For retaining the post 220 and the valve plunger 217 connected therewith in either the upper or lower position, the post is provided near its lower end with two detent notches disposed to be engaged alternatively by a spring pressed detent plunger 229.

The direction of movement of the quill 34 may also be reversed automatically by means of the control drum 37, a reversing trip dog 232 being adjustably positioned upon the drum for engagement with a reverse plunger 233 or a reverse plunger 234 depending upon the direction in which the quill is moving. As shown in Fig. 10, the reverse plungers 233 and 234 are disposed at opposite sides of the tripping post 220 respectively and are interconnected by means of a pivoted lever 235 in such manner that when one plunger is depressed by a reverse dog 232, the other plunger is moved upward and vice versa. As appears in Figs. 10 and 24, the reverse plunger 234 extends downward into the control panel 205 and constitutes the plunger of a hydraulic control valve 236, the valve plunger being normally held in a neutral or central position by a spring 237 thereon. A stop dog 202 is preferably positioned just in front of the reverse dog 232 for engaging the tripping arm 208 to assist in the reversing action and to prevent further movement of the quill in the event that the reverse mechanism should fail to function.

Referring particularly to the hydraulic circuit shown in Fig. 24, hydraulic pressure for actuating the automatic quill reverse system is derived from the pump 122 from which pressure fluid is conducted through a channel or conduit 241 and a conduit 242 to a port 243 in the valve 236 that communicates with a port 244 from which the pressure fluid may flow into a conduit 245 and thence by way of a conduit 246 to a low pressure relief valve 247 discharging into a conduit 248 that distributes the oil throughout the column 32 for lubricating the mechanism that derives the spindle and the quill.

When the valve plunger 234 is depressed by the engagement with a reverse dog 232, for example, the port 244 is closed by a land 251 on the plunger thereby preventing the pressure from escaping through the conduits 245 and 246 to the low pressure relief valve 247. This causes the pressure in the conduits 241 and 242 to build up to a predetermined maximum after which the excess oil escapes from the conduit 241 through a conduit 252 into a high pressure relief valve 253 from which it is discharged into the low pressure relief valve 247 and thence to the lubricating system. As the plunger 234 moves downward, a land 254 thereon uncovers a port 255 which admits the high pressure fluid from a conduit 256 that communicates with the conduit 242 leading from the pump 122. The high pressure fluid then enters a longitudinal passageway 257 in the plunger through which it flows upward to a cylinder 258 at the upper end of the valve 236 and exerts pressure upon a piston 259 on the plunger 234 in manner to quickly force the valve plunger downward through the remaining part of its stroke. By reason of this movement, the land 254 moves past the high pressure port 255 thereby establishing communication with a port 261 from which the oil flows through a conduit 262 into the lower end of a clutch operating or reversing cylinder 263. Within the clutch operating cylinder 263 is a piston 264 that is fixed on the vertically disposed reverse clutch operating rod 197, as shown in Fig. 12. The pressure fluid entering the bottom of the cylinder 263 forces the piston 264 upward thereby raising the rod 197 and the clutch shifting fork 198 in manner to move the reversing clutch spool 171 upward into engagement with the clutch gear 166. The oil in the top of the cylinder 263 is forced out through a conduit 265 which leads to a port 266 in the valve 236 that communicates with an exhaust port 267 from which the oil is discharged into the interior of the column 32 and drains into a sump in the bottom of the housing 30.

As the clutch actuating piston 264 completes the shifting of the reverse clutch 171, in moving to the top of the cylinder 263 it uncovers a port 269 in the cylinder wall and permits the high pressure fluid to flow through a conduit 270 leading to a port 271 in the valve 236 that is connected at all times with a conduit 272 that leads to a port 273 in a valve casing 274 which encloses the previously mentioned rapid traverse valve plunger 217. The pressure fluid upon entering the port 273 exerts pressure upon the lower side of a piston 275 on the valve plunger 217 in manner to move it upward within the casing 274 in the same way that it may be moved upward by the hand lever 175 or by the tripping post 220 for engaging the rapid traverse drive mechanism to effect the reverse movement at rapid traverse rate.

When the piston 275 on the rapid reverse valve plunger 217 is moved to its upper position, it uncovers a port 276 which communicates through a conduit 277 with a port 278 in the valve casing 236 leading to the plunger actuating cylinder 258. At the same time, the valve plunger being in the upper position, the port 276 is placed in communication with a passage-way 279 extending longitudinally through the plunger 217 and communicating at the lower end thereof with a port 280 which connects by means of a conduit 281 with a port 282 in the lower end of the valve casing 236. This connection completes a passage-way from the actuating cylinder 258 at the top of the valve 236 over to and down through the plunger 217 of the rapid traverse valve and back to the bottom of the reverse valve 236, through which an equalizing upwardly acting pressure is applied to a piston 283 on the plunger 234. This balances the forces acting on the plunger 234 and permits it to be returned to its neutral position by the spring 237, thereby uncovering the port 244 and permitting the high pressure fluid to escape through the conduits 245 and 246 to the low pressure relief valve 247. By this arrangement, the high pressure is maintained in the system only until the shifting movement of the reverse clutch is completed and the rapid traverse valve plunger 217 is moved to rapid traverse position, whereupon the reverse valve plunger 234 is returned to neutral position and the pressure in the system is reduced to that established by the low pressure relief valve.

The conduit 245 which leads from the port 244 in the reverse valve 236 and that communicates at all times with the low pressure relief valve through the conduit 246, also connects to a port 285 in the rapid traverse valve housing 274. When the rapid traverse valve plunger 217 is in its upper position, the low pressure port 285 is placed in communication with a port 286 connected with a conduit 287 that leads to the feed and rapid traverse clutch mechanism 152. From the conduit 287, the oil enters a cap or housing 288 at the upper end of the shaft 161 and passes into a passage-way 289 extending longitudinally of the shaft to a cylinder 290 where it exerts pressure upon a piston 291 forcing it downward in manner to engage the rapid traverse friction clutch 163. By this arrangement reversal in the direction of movement of the quill 34 is caused to take place at rapid traverse rate automatically, consequently the quill may be moved forward at feed rate, in effecting a cutting operation, to a position predetermined by the position of the reversing dog 232 on the drum 37, whereupon the quill will be automatically withdrawn at rapid traverse rate.

When the other reverse plunger 233 is depressed by another reverse dog 232, the interconnected pivoted lever 235 causes the plunger 234 to be moved upward thereby effecting shifting of the reverse clutch in the other direction. With the reverse plunger 234 in the upper position, the high pressure port 255 is placed in communication with the port 266 that connects to the conduit 265 leading to the upper end of the reversing cylinder 263. The fluid pressure then forces the reversing piston 264 downward to engage the reverse clutch 171 with the clutch gear 170, the oil in the bottom of the cylinder escaping through the conduit 262 leading to the port 261 that then connects with an exhaust port 292 from which it is discharged. When the piston 264 approaches the bottom of the cylinder 263 it again uncovers the port 269 and permits the pressure fluid to flow through the conduits 270 and 272 to actuate the rapid traverse valve plunger 217. This results in neutralizing the reversing valve plunger 234 as previously explained, and in engaging the rapid traverse clutch 163.

Automatic control of the movement of the quill may also be effected by means of the previously mentioned table actuated trip mechanism 176 which function in response to movement of the table 31 to actuate the reverse valve plunger 234 in manner to start movement of the quill in either direction of movement. As appears in Figs. 10 and 24, the reverse valve plunger 234 is provided at its lower end with a notch or groove 295 that is engaged by one end of a rocking lever 296 pivotally mounted at its center and engaging at its other end with a notch 297 in a vertically disposed control rod 298. As appears in Figs. 10 and 20, the control rod 298 is arranged to be moved vertically by an arm 299 which engages a notch 300 therein and is mounted on a horizontal rock shaft 301 which extends to the table actuated trip mechanism 176 on the front of the column, as shown in Figs. 1 and 3. Referring to Figs. 19 and 20, the rock shaft 301 carries oppositely projecting arms 302 and 303 which engage with push rods or plungers 304 and 305 that are in turn engaged respectively by push rods or plungers 306 and 308 extending forward into the trip mechanism 176. The push rod 306 is engaged at its forward end by two pivotally mounted tripping levers 309 and 310 and the push rod 308 is engaged by a similar pair of pivotally mounted tripping levers 311 and 312, the mechanism being protected by a hinge cover plate 313 as shown.

For operating the tripping mechanism 176 there are provided a plurality of tripping posts 315 which are adjustably secured in a T slot 316 in the back edge of the table 31, as shown in Figs. 1, 20 and 22. The tripping posts 315 are arranged to carry tripping dogs 317 in any of four vertically spaced positions, as shown in Figs. 22 and 23, the four positions corresponding in elevation to the positions of the four pivotally mounted tripping arms 309, 310, 311 and 312, the arrangement being such that any one of the tripping levers may be actuated at any position in the travel of the table 31 by properly arranging a tripping dog 317 and its supporting post 315 in the T slot 316. As appears in Fig. 19, each of the pivoted tripping levers is normally maintained in neutral position by means of a cooperating spring pressed plunger 318, and the levers of each pair, for instance the levers 309 and 310 acting upon the push rod 306, are arranged to actuate the rod when the table 31 is moving in opposite directions respectively. For example, with the table moving from right to left and with the trip dog 317 in the top position as shown in Figs. 19 and 20, the tripping lever 309 will be engaged by the dog and pivoted in the manner indicated in the dotted lines to force the push rod 306 inwardly. This causes the push rod 304 to move the arm 302 on the shaft 301 in manner to turn the shaft counterclockwise, as seen in Fig. 20, thereby moving the control rod 298 downward and pivoting the lever 296 in direction to move the reverse valve plunger 243 upward, which results in either starting movement of the quill or reversing its direction of movement in the manner previously explained, to cause it to move in a predetermined direction. When the table 31 is moved in the opposite direction, the trip dog 317 in engaging the tripping lever 309 pivots it in direction to move it out of contact with the push rod 306 without causing movement of the reverse valve.

If it is desired to effect control of the quill by movement of the table from left to right, the dog 317 may be moved down to the next lower position in order to engage the trip lever 310 which is then pivoted in direction to actuate the push rod 306 and move the reverse valve plunger 234 upward. For effecting movement of the quill in the other direction of its movement, the trip dog 317 is placed in one of the lower positions for engaging either of the tripping levers 311 or 312 to actuate the push rods 308 and 305 which operate through the previously described mechanism to move the valve plunger 234 downward. By means of this control mechanism, it is possible to move the table in manner to feed a workpiece to a cutter in the spindle 33 for finishing one surface thereon, and then to automatically withdraw the quill 34 to permit an obstruction on the workpiece to advance without interfering with the cutter, after which the quill may be advanced again to a position for effecting another cutting operation at the other side of the obstruction.

As previously explained, the quill 34 can be stopped in its forward feeding movement at a precisely predetermined position by means of the adjustable stop nut 38 on the quill feeding screw 47 (Figs. 1 and 5) upon the positive stop nut engaging the abutment 61 in the spindle head. When the positive stop engages the abutment, further movement of the quill is prevented and the torque exerted by the driving mechanism is definitely limited by slipping of the torque limiting device 149. If the quill is driven against the stop at rapid traverse rate, the torque limiting device 156 will slip first and thereby transfer the driving load to the feed rate driving mechanism.

In order to disengage the power driving connection and thereby avoid continued slipping of the torque limiting devices, a control mechanism is provided that functions automatically in response to slipping of either torque limiting device and is operative to move the quill driving clutch 171 to neutral position. As shown in Figs. 9 and 13, the torque limiting device 149 includes a clutch collar 320 fixed on the worm of the worm drive 150, and a cooperating clutch collar 321 slidably keyed on the shaft 148, the two collars being provided with interacting angular faces that are normally held together by a spring 322. Upon the occurrence of excessive torque in the feed driving mechanism, the collar 321 moves to the left against the force exerted by the spring 322, and out of engagement with the collar 320. In so moving, the collar 321 acts upon a fork member 323, moving it to the left as shown in Fig. 9 in manner to turn a bell crank 324 clockwise through engagement of one arm thereof with a groove 325 in the fork 323. The other arm of the bell crank 324 engages a groove 326 in a vertically disposed control rod 327 in manner to move the rod downward.

Figure 15:
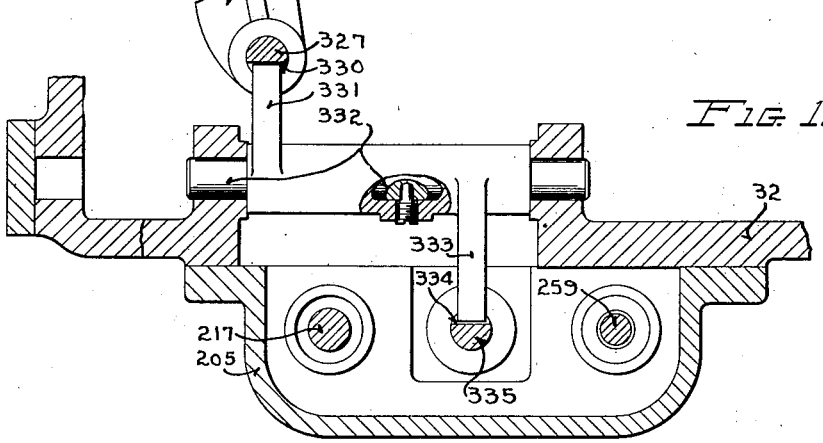
Fig. 15 is another detailed view in horizontal section taken along the plane represented by the line 15—15 in Fig. 10.

The rapid traverse torque limiting device 156 is of construction generally similar to that of the device 149, but is provided with longer angular faces to avoid premature disengagement when the rapid traverse drive is engaged. The device 156 is disposed to engage a fork 329 which is directly secured to the vertical control rod 327, the arrangement being such that upon slipping of the device 156, the rod 327 is moved downward in the same manner that it is when the device 149 slips. Referring now to Figs. 12 and 15, the control rod 327 is provided near its lower end with a notch 330 that engages the end of an arm 331 on a horizontal rock shaft 332, which also carries a forwardly projecting arm 333 that engages with its outer end a slot 334 in a valve plunger 335, the arrangement being such that when the control rod 327 is moved downward upon slipping of either torque limiting device the valve plunger 335 is moved upward within a valve casing 336 mounted in the control panel 205.

Referring to the circuit diagram Fig. 24, fluid under pressure from the pump 122 flows through the conduits 241 and 242 and a conduit 337 to a port 338 of the valve casing 336. When the valve plunger 335 is moved upward in response to functioning of either torque limiting device, the valve port 338 is placed in communication with the valve port 339 that is connected by a conduit 340 to a clutch disengaging cylinder 341. As best shown in Fig. 13, the cylinder 341 is disposed in alignment with the horizontally disposed clutch control rod 193 and is provided with a piston 342 that is slidably fitted on the rod 193 in manner to engage a collar 343 secured to the left end of the rod. With the quill moving outward, the piston 342 is at the right end of cylinder 341 and when pressure is admitted to the cylinder through the conduit 340, the piston 342 is moved to the left, as shown in Figs. 13 and 24, until it engages a fixed abutment 344 at the middle of the cylinder. This action of the piston moves the control rod 193 to the left to its neutral position in which the detent 199 engages the central detent notch therein as shown in Fig. 13, the rod moving the reverse clutch 171 to the intermediate disengaged position shown in Fig. 12, thereby completely disconnecting the power driving mechanism from the quill moving mechanism. Since the rod 193 is slidably fitted in the piston 342, the rod is free to be moved further to the left for engaging the reverse clutch to retract the quill. Any oil which may happen to escape into the left end of cylinder 341 may be discharged through the exhaust opening 345 therein.

Although the automatic quill stopping mechanism is shown as being operative for stopping the movement of the quill 34 only in the outward or forward direction, since the positive stop mechanism is arranged for limiting the forward feeding movement only of the quill, it is to be understood that another positive stop could be arranged readily for stopping movement of the quill in the other direction and if necessary another clutch disengaging control mechanism similar to the cylinder 341 could readily be provided for disengaging the driving clutch when the quill is stopped at the end of a stroke in the other direction. Further it is to be understood that positive stop disconnecting mechanism of this nature may be arranged to effect reversal of movement of the quill and that it may be applied readily to the work supporting table 31 or to any other movable member of a machine which it may be desirable to move to an accurately predetermined position under power.

When the quill 34 is being operated to feed a cutter in the spindle 33 forward into a workpiece to a predetermined depth, it is desirable that the table 31 supporting the workpiece be held rigidly on the bed 30. For this purpose there is provided an improved table clamping mechanism shown in Figs. 3 and 4. As shown, the clamping device is actuated by a hand lever 348 at the front of the machine that is connected to a screw threaded rod 349 which may be turned to exert pressure upon a clamping member 350. The clamping member 350 is disposed in a socket 351 in the bed 30 and is provided at its lower end with a spherical portion 352 that engages the socket walls in the manner to constitute a pivotal mounting for the clamping member. The upper end of the member 350 is engaged by a cover plate 353 that prevents upward movement thereof and it is provided with an inwardly projecting clamping lug 354 which bears upon a gib 355 engaging an angularly disposed face of the table 31. The arrangement is such that when the lever 348 is actuated to force the screw 349 against the clamp member 350, the member pivots about its spherical lower end 352 in such manner that its clamping portion 354 bears upon the gib 355 and rigidly clamps the table 31 to the bed 30.

When it is desired to make two or more cuts on a workpiece at different predetermined depths, a modified positive quill stopping device may be arranged including a plurality of successively engageable adjustable abutments or stop members carried by the work supporting fixture, as shown in Figs. 27 and 28. In this instance, a positive stop member or abutment 358 is attached to the front of the quill 34 beneath the spindle 33 by means of a harness 359 which encircles the forward end of the quill, as shown in Fig. 3, and is clamped thereto by means of a clamp bolt 360. A work supporting fixture 361 secured on the work table 31 carries a plurality of individually adjustable complementary precision stops or abutment members 362 disposed in the horizontal plane of the stop member 358. By moving the table 31 to a position in which one of the abutments 362 is in alignment with the stop 358, the quill 34 may be advanced to feed a cutter 363 carried by the spindle 33, into a workpiece 364 carried by the fixture 361 to a depth predetermined by the adjustment of the abutment. The quill 34 may then be withdrawn, the table unclamped and adjusted to bring another adjustable abutment into alignment with the stop 358, whereupon a second cut of a different predetermined depth may be effected in the workpiece 364 by the cutter 363. In the particular workpiece shown in Figs. 27 and 28 of the drawings, a plurality of holes of different predetermined depths have been formed by the cutter 363, but it is to be understood that a plurality of slots or faces may be machined along different planes predetermined by the adjustable abutments 362, by feeding the table longitudinally after the cutter 363 has been moved forward to the predetermined position.

Longitudinal movement of the work supporting table 31 may be automatically controlled by means of trip dogs 366 adjustably mounted on its forward face (as shown in Fig. 3) that cooperate with trip posts 367 which actuate rate changing and table stopping mechanism and a table reversing valve 368, as more fully explained in the previously mentioned Patent No. 2,007,434. Corresponding manual control of the rate and direction of table movement may be effected by a hand lever 369 mounted on the front of the machine bed, and actuation of the main clutch 124 for starting and stopping the spindle 33 may be effected by a hand lever 370 mounted below the lever 369.

In order to coordinate the movements of the work table 31 with those of the tool supporting quill 34, automatic trip mechanism for controlling the table has been arranged to be actuated by the control drum 37 associated with the quill. As appears in Figs. 1, 10, 25 and 26, the quill controlling drum 37 is provided on its periphery with adjustably positioned dogs 372 which cooperate with trip mechanism 373 mounted on the column at the side of the drum. As shown in Figs. 3 and 25, the dogs 372 are mounted in two T slots 374 and are reversible in each slot in such manner that they may be positioned to engage any one of four tripping levers 375 which are generally similar in arrangement to the tripping levers of the table actuated quill controlling mechanism 176. As appears in Figs. 25 and 26, the tripping levers 375 are arranged in pairs to act upon table reversing pilot valves 376 and 377 which function to effect movement of the table 31 in opposite directions respectively, the tripping levers being pivotally mounted in such manner that the levers of each pair respond respectively to movement of the drum 37 in opposite directions.

Referring to the circuit diagram Fig. 24, it will appear that when the valve 376, for instance, is depressed by a tripping lever 375 which is engaged by a dog 372, fluid pressure will flow from the pump 122 through the conduit 241 and a conduit 378 to a port 379 of the valve 376 which then communicates with a port 380 connected by a conduit 381 to a cylinder 382 at the left end of the table reversing valve 368. Pressure in the cylinder 382 acts upon a piston 383 therein, moving it to the right into engagement with a plunger 384 in the valve 368 which is then moved to the right in manner to admit pressure from the table controlling pump 123 for actuating the table reversing gearing 111 to cause movement of the table to the left, as is more fully explained in the previously mentioned patent. After the trip dog 372 has moved out of engagement with the trip lever 375, the valve 376 is returned to its initial position by a spring 385 and oil in the cylinder 382 is forced out by means of a spring 386 acting on the piston 383, through the conduit 381 and the port 380 which now communicates with an exhaust port 387 from which the oil is discharged into the sump. When the other pilot valve 377 is moved to open position, pressure fluid from the conduit 378 enters a port 388 which then communicates with a port 389 from which a conduit 390 leads to a cylinder 391 at the right end of the table reversing valve 368, pressure in the cylinder 391 causing a piston 392 therein to move to the left for engaging and moving the valve plunger 384 to the left in manner to effect movement of the table 31 to the right. After the valve 377 has been returned by a spring 393 to its initial position, a spring 394 on the piston 392 forces the oil out of the cylinder 391 through the conduit 390 and the port 389 which then communicates with an exhaust port 395 from which the oil is discharged into the sump.

Movement of the work supporting table 31 may also be controlled automatically by a modification of the control mechanism which responds to the torque limiting devices of the quill driving mechanism, the arrangement being such that when the quill is stopped at a predetermined position by the positive stop device, the work table 31 may be started automatically in either direction selectively to effect a cutting stroke along the plane predetermined by the positive stop. Referring particularly to the circuit diagram Fig. 29, in which is shown a modified control system for effecting this result, there is provided an interconnection between the quill stopping cylinder 341 and the table reversing valve 368. This interconnection includes a selector valve 398 by means of which the table 31 may be caused to move in either direction or to remain stationary upon tripping of the torque limiting mechanism when the forward movement of the quill is checked by the positive stop device.

As previously explained, when either or both of the torque limiting devices 149 or 156 slips as a result of an overload, the control rod 327 (Figs. 9 and 12) is moved downward and actuates the lever 331 to turn the control shaft 332 which carries the forwardly projecting arm 333. As appears in Fig. 29, according to this modification, the end of the arm 333 engages a notch 399 in a plunger 400 of a control valve 401 which is similar in function to the control valve 336 previously described. Fluid under pressure flows from the conduit 242 leading from the pump 122, through a conduit 402 that leads to a port 403 in the valve 401. With the plunger 400 in the upper position in response to an overload condition, the port 403 is placed in communication with a port 404 that connects to a conduit 405 leading to a port 406 in valve casing 407 that is associated with the quill stopping cylinder 341 and encircles the quill clutch control rod 193. Pressure from the port 406 passes through a groove 408 in the control rod 193 to a port 409 from which it flows through a conduit 410 to a groove 411 in the selector valve 398. With the selector valve 398 in the mid-position as shown, the groove 411 communicates with a conduit 412 through which the pressure flows to a conduit 413 and thence into a check valve 414 and a conduit 415 leading to a port 416 of the valve 407 which is connected at all times with a conduit 417 leading into the clutch disengaging cylinder 341.

With the selector valve 398 in the mid-position shown, the effect of an overload in moving the valve plunger 400 upward is exactly the same as that occurring in the control system shown in Fig. 24 associated with the torque limiting devices, in that the piston 342 is moved to the left to disconnect the power source from the quill driving mechanism, there being no change in the operation of the table driving mechanism. However, when the selector valve 398 is moved either to the right or to the left the table is caused to move in corresponding direction upon tripping of the quill overload mechanism. For example, when the selector valve 398 is moved to the left by turning a control lever 419 connected with it to the left, the groove 411 therein remains connected with the source of pressure through the conduit 410 as previously explained, but is moved out of communication with the conduit 412 and into communication with a conduit 420 that leads to the cylinder 382 at the left end of the table reversing valve 368. Pressure in the cylinder 382 then forces the piston 383 and the valve plunger 384 to the right thereby causing the table 31 to move to the left as previously explained. As the piston 383 is moved to the right it uncovers a port 421 which admits pressure fluid to the conduit 413 from which it flows, as previously explained, through the check valve 414 the conduit 415 the port 416 and the conduit 417 to the cylinder 341 for moving the piston 342 to the left thereby shifting the control rod 193.

As the rod 193 is moved to the left, the groove 408 therein moves out of communication with the pressure port 406 and a groove 422 therein moves to a position connecting the pressure port 406 directly with the port 416 and the conduit 417 leading to the cylinder 341. The piston 342 then continues to move the left until it engages the stop 344, the control rod 193 functioning meanwhile to move the quill driving clutch 171 to the neutral or disengaged position. With the control rod 193 in its mid-position, the valve groove 408 therein communicates with an exhaust port 423, effecting a connection whereby the fluid in the cylinder 382 may be forced by the spring 386 acting on the piston 383 back through the conduit 420 the groove 411 and the conduit 410 to the port 409 and thence through the groove 408 to the exhaust port 423, thereby releasing the table controlling valve plunger 384 for operation by the table trip dogs 366.

After the quill driving clutch 171 has been disengaged and the torque limiting clutches have both been reengaged, the valve plunger 400 moves down to its initial position shown in Fig. 29, whereupon the liquid in the cylinder 341 may be exhausted back through the conduit 417 the port 416 and the conduit 415 to an exhaust conduit 426 that leads to a port 427 in the valve casing 401 which now communicates with an exhaust port 428, thereby releasing the pressure in the cylinder 341 and freeing the control rod 193 for movement to the right in effecting subsequent control operations.

Upon moving the selector valve lever 419 to the right, the pressure groove 411 in the valve is moved into communication with a conduit 430 which leads to the cylinder 391 at the right end of the table reversing valve 368. Pressure in the cylinder 391 forces the piston 392 and the reversing valve plunger 384 to the left in manner to cause movement of the table to the right. As the piston 392 moves to the left it uncovers a port 431 which communicates with the conduit 413, permitting the pressure fluid to flow through the check valve 414 the conduit 415 and port 416 and the conduit 417 to the cylinder 341 for moving the piston 342 to the left to disengage the quill driving clutch 171 as previously described. After the shifting operation has been completed, the pressure in the cylinder 391 escapes back through the conduit 430, the groove 411 the conduit 410 and the port 409 to the exhaust port 423, as before. When the selector lever 419 is moved to the neutral position, both the conduits 420 and 430 are connected with a groove 432 in the valve 398 which is open to atmosphere to permit the escape of any pressure fluid which may remain in either the cylinder 382 or the cylinder 391 of the table controlling valve 368.

From the foregoing description of the illustrative embodiment of this invention, it is apparent that there has been provided an improved mechanism capable of effecting coordinated movements of a plurality of machine parts and capable of improved operation in performing automatic machining cycles. For example, if it is desired to machine a series of slots or faces of different predetermined depths in a workpiece mounted on the work table 31, the table is started in the proper direction by manipulating the hand lever 369, and after it has moved to a predetermined position the quill may be started forward by the table actuated trip mechanism 176 and the table stopped by its trip mechanism 367 with an abutment 362 in alignment with the quill. The quill carrying the cutter is then fed forward until it is stopped by engagement with the abutments 362 on the table, with the cutting tool in predetermined position to make a cut of desired depth in the workpiece. The overload trip mechanism associated with the quill then disconnects the quill drive and engages the table drive to feed the workpiece relative to the cutter through a first cutting stroke at the end of which the quill controlling trip mechanism 176 is engaged by a table dog to effect withdrawal of the quill, the table being stopped by its trip mechanism during the withdrawal movement. At the end of the withdrawal movement, the table is started by the control drum 37 and the quill is stopped by a stop dog on the drum after which the quill may be started forward again by another dog on the table and the table stopped with another abutment 362 in position to be engaged by the quill. Upon the quill engaging the second abutment, the table is started forward again as before to move the workpiece through the second cutting stroke at another predetermined depth. Other cutting strokes may be performed in the same manner at different predetermined depths, and the table may be stopped at the end of the cycle or returned to its original position for repeating the cycle automatically, as may be desired.

For accomplishing the foregoing and other improved modes of operation there has been provided by the present invention improved transmission and control mechanism for actuating the various movable parts of the machine, together with various other improvements in the arrangement of parts and in structural features which tend to improve the operation and efficiency of machine tools generally.

Although the foregoing description and accompanying drawings are directed for the most part to a particular exemplary machine tool which has been described in considerable detail for the purpose of setting forth an operative embodiment of the present invention, it is to be understood that the particular structures shown and described are intended to be illustrative only and it is contemplated that the various features of the invention may be incorporated in other forms without departing from the spirit and scope of the invention as defined in the subjoined claims.

The invention having been particularly set forth is hereby claimed as follows:

1. In a machine tool, the combination with a base and a supporting member movably mounted on said base, of power operated means engageable for moving said member, a positive stop device disposed to stop the movement of said member relative to said base positively at a predetermined position, a torque limiting safety clutch associated with said power operated means and disposed to slip when said positive stop device prevents further movement of said supporting member, and means actuated by said safety clutch in response to slippage thereof and operative to disengage said power operated member moving means, whereby said supporting member may be stopped at a precisely predetermined position and said power operated means automatically disengaged promptly after said member is stopped.

2. In a machine tool, in combination, a movable part, a power driven transmission mechanism operatively connected to move said part, said transmission mechanism including a safety clutch adapted to slip under a torque load greater than a predetermined maximum, a source of power, means selectively connecting said source of power to drive said transmission mechanism, a positive stop arranged to limit movement of said movable part at a predetermined position, and a control mechanism responsive to slipping of said safety clutch and operative to disconnect said means connecting said source of power to said transmission mechanism, whereby said movable part may be driven by power to the position predetermined by said positive stop and the power drive then automatically disconnected upon slipping of said safety clutch without danger of injury to said transmission mechanism.

3. In a machine tool, the combination with work supporting means, of a cutter spindle mounted for bodily movement in cooperating relationship with said work supporting means, power operated means engageable for effecting said bodily movement of said cutter spindle and engageable for effecting movement of said work supporting means, an adjustable positive stop device for positively stopping bodily movement of said cutter spindle at a predetermined position, and automatic means disposed to disengage said power operated means from said cutter spindle and engage it with said work supporting means upon engagement of said positive stop device in stopping movement of said spindle.

4. In a machine tool, the combination with a frame, a supporting element movably mounted

CERTIFICATE OF CORRECTION.

Patent No. 2,293,880.   August 25, 1942.

JOSEPH B. ARMITAGE, ET AL,

It is hereby certified that error appears in the printed specification of the above numbered patent requiring correction as follows: Page 7, second column, line 52, for the word "derives" read --drives--; page 8, second column, line 51, for "function" read --functions--; page 14, second column, line 3, claim 19, after "means" insert --and--; line 29, claim 21, for "relectively" read --selectively--; and that the said Letters Patent should be read with this correction therein that the same may conform to the record of the case in the Patent Office.

Signed and sealed this 6th day of October, A. D. 1942.

(Seal)

Henry Van Arsdale,
Acting Commissioner of Patents.

whereby said relatively movable elements may be moved by said power driven means to a position accurately predetermined by said positive stop device whereupon said force limiting mechanism functions to limit the force exerted by said power driven means upon said elements and subsequently to disconnect said power driven means from said elements automatically.

25. In a machine tool having a frame, two cooperating carriages movably mounted on said frame, power actuated means selectively connectable to move either of said carriages in either direction, a control system for effecting coordinated movement of said carriages, said control system comprising a source of hydraulic pressure, valve means operative when actuated to effect reversal of one of said carriages, trip mechanism responsive to movement of either of said carriages and operative to actuate said reversing valve means, other valve means operative when actuated to effect reversal of the other of said carriages, and additional trip mechanism responsive to movement of either of said carriages and operative to actuate said last mentioned reversing valve means, whereby either carriage may be reversed in response to its own movement or in response to movement of the other carriage.

26. In a machine tool having a frame, two cooperating carriages movably mounted on said frame, power actuated driving means selectively connectable to move either of said carriages in either direction, a control system for effecting coordinated movement of said carriages, said control system including torque responsive means in the driving connection to one of said carriages, means responsive to said torque responsive means and operative to disconnect said driving means from said one carriage upon the occurrence of excessive torque resulting from engagement of said carriage with a positive stop, and hydraulic control means responsive to operation of said torque responsive means and operative to connect said power driving means to effect movement of said other carriage.

27. A machine tool comprising a frame, a supporting member movably mounted on said frame, power driven mechanism for effecting movement of said supporting member including apparatus operative to drive said member at feed rate and apparatus operative to drive said member at rapid traverse rate, a torque responsive device associated with said feed rate driving apparatus, a torque responsive device associated with said rapid traverse rate driving apparatus, and disconnecting means associated with said power driven mechanism and connected to operate upon the occurrence of excessive torque in either torque responsive device to disconnect said power driven mechanism from said supporting member, whereby when said supporting member meets with an obstruction while being moved at either feed rate or rapid traverse rate the corresponding torque responsive device functions to disconnect said power driven mechanism automatically.

JOSEPH B. ARMITAGE.
ORRIN W. BARKER.

CERTIFICATE OF CORRECTION.

Patent No. 2,293,880. August 25, 1942.

JOSEPH B. ARMITAGE, ET AL,

It is hereby certified that error appears in the printed specification of the above numbered patent requiring correction as follows: Page 7, second column, line 52, for the word "derives" read --drives--; page 8, second column, line 51, for "function" read --functions--; page 14, second column, line 3, claim 19, after "means" insert --and--; line 29, claim 21, for "relectively" read --selectively--; and that the said Letters Patent should be read with this correction therein that the same may conform to the record of the case in the Patent Office.

Signed and sealed this 6th day of October, A. D. 1942.

(Seal)

Henry Van Arsdale,
Acting Commissioner of Patents.